United States Patent
Wu et al.

(10) Patent No.: US 12,078,651 B2
(45) Date of Patent: Sep. 3, 2024

(54) DEVICE FOR SAMPLE PRETREATMENT

(71) Applicant: Hangzhou Calibra TECHNOLOGIES Co., Ltd., Hangzhou (CN)

(72) Inventors: Sili Wu, Hangzhou (CN); Shishan Fu, Hangzhou (CN); Yabo Wang, Hangzhou (CN); Jianbing Du, Hangzhou (CN); Huafen Liu, Hangzhou (CN)

(73) Assignee: HANGZHOU CALIBRA TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/297,688

(22) Filed: Apr. 10, 2023

(65) Prior Publication Data

US 2024/0053370 A1 Feb. 15, 2024

(30) Foreign Application Priority Data

Aug. 15, 2022 (CN) .......................... 202210971804.0

(51) Int. Cl.
*G01N 35/04* (2006.01)
*G01N 30/04* (2006.01)
*G01N 35/10* (2006.01)

(52) U.S. Cl.
CPC ............. *G01N 35/04* (2013.01); *G01N 30/04* (2013.01); *G01N 35/1065* (2013.01);
(Continued)

(58) Field of Classification Search
None
See application file for complete search history.

(56) References Cited

U.S. PATENT DOCUMENTS

| 6,489,171 B1 | 12/2002 | Aghassi et al. |
| 2020/0369423 A1 | 11/2020 | Liang |
| 2024/0026336 A1* | 1/2024 | Mi ..................... C12N 15/1003 |

FOREIGN PATENT DOCUMENTS

| CN | 108918244 A | 11/2018 |
| CN | 110013892 A | 7/2019 |

(Continued)

OTHER PUBLICATIONS

Search Report accompanying with First Office Action, Application No. 2022109718040 Dated Aug. 15, 2022.

*Primary Examiner* — P. Kathryn Wright
(74) *Attorney, Agent, or Firm* — MUNCY, GEISSLER, OLDS & LOWE, PC

(57) ABSTRACT

A full-automatic sample pretreatment device includes a frame module, a cap removing module, a blood-collection tube grasping module, a pipette module, a platform module, a handling module, a film sealing module, a magnetic solid phase extraction module, an SPE positive pressure extraction module and a conveyor belt waste transfer module. A conveyor belt waste transfer module is arranged at a bottom of the frame module, the cap removing module, the platform module and the magnetic solid phase extraction module are sequentially arranged in the middle of the frame module from left to right, and the blood-collection tube grasping module, the pipette module, the handling module and the film sealing module are arranged at an upper portion of the frame module. The magnetic solid phase extraction module and the SPE positive pressure extraction module are detachable and interchangeable components.

8 Claims, 14 Drawing Sheets

(52) U.S. Cl.
CPC ............... *G01N 2035/0405* (2013.01); *G01N 2035/0441* (2013.01); *G01N 2035/0475* (2013.01); *G01N 2035/0484* (2013.01)

(56) References Cited

FOREIGN PATENT DOCUMENTS

| CN | 211027415 U | 7/2020 |
| CN | 215375258 U | 12/2021 |
| CN | 114371063 A | 4/2022 |
| CN | 114813285 A | 7/2022 |

* cited by examiner

DEVICE FOR SAMPLE PRETREATMENT

CROSS-REFERENCE TO RELATED APPLICATIONS

The present disclosure claims a Chinese prior application numbered 202210971804.0 and filed on Aug. 15, 2022, and all contents of the application, including the description, drawings, abstract and claims are incorporated herein by reference.

BACKGROUND OF THE INVENTION

Field of the Invention

The present disclosure relates to the technical field of chemical analysis, in particular to a sample pretreatment method for high performance liquid chromatography tandem mass spectrometry detection, more particularly to a sampling device for sample pretreatment and a pretreatment method.

Description of the Related Art

High performance liquid chromatography tandem mass spectrometry (HPLC-MSIMS) is a method that combines high efficiency separation and multi-component characterization and quantification with unique advantages for the separation and identification of high boiling point, non-volatile and thermally unstable compounds. As testing becomes routine, the high performance liquid chromatography tandem mass spectrometry is being gradually being used widely, especially in medical institutions such as laboratories and hospitals, instead of being used in the laboratory alone.

Generally, before liquid phase and mass spectrometry detection, samples are needed to be pretreated. Currently, in the traditional methods, the pretreatment of samples is mainly dominated by cupping, and most still use manual work, automation is not high, it is mainly based on a single extraction method to solve the problem that the liquid-liquid extraction, protein precipitation, SPE (solid-phase extraction) and other methods need a lot of manual operation and low efficiency. Foreign brands of existing products, such as Deken and Hamilton, are mainly dominated by cupping, and the front end does not automatically open the cap, and SPE positive pressure extraction is not integrated. Domestic products are similar. The main function of the domestic products is liquid separation, and the degree of automation is not high, and manual operation is needed in the procedure.

With the increasing demand of application, the automatic operation of module line has become the main demand at present. Therefore, such an automatic sample pretreatment device is urgently needed in the market.

BRIEF SUMMARY OF THE INVENTION

The present disclosure overcomes the shortcomings of the prior art by providing a high-throughput automatic sampling device for sample pretreatment and a pretreatment method. The samples treated in this way can be directly injected and tested at the liquid phase, and then undergo mass spectrometric detection until the final test results are acquired, so as to complete the process from the beginning of sampling to the test results obtained, without human manual operation during all the intermediate processes, that is, fully automated processing is achieved.

In one aspect, the present disclosure provides a fully automatic sample pretreatment device or system, the system includes a frame module, a cap removing module, a blood-collection tube grasping module, a pipette module, a platform module, a handling module, a film sealing module, a magnetic solid phase extraction module, an SPE positive pressure extraction module and a conveyor belt waste transfer module; the conveyor belt waste transfer module is arranged at the bottom of the frame module, the cap removing module, the platform module and the magnetic solid phase extraction module are sequentially arranged in the middle of the frame module from left to right, and the blood-collection tube grasping module, the pipette module, the handling module and the film sealing module are arranged at the upper portion of the frame module; the magnetic solid phase extraction module and the SPE positive pressure extraction module are detachable and interchangeable components.

The cap removing module achieves the fixation of the blood-collection tube, and achieves the cap removing of the blood-collection tube in combination with a part of the blood-collection tube grasping module; the blood-collection tube grasping module achieves grasping the blood-collection tube; the pipette module achieves shifting the corresponding sampled liquid; the handling module achieves the handling of liquid and sample; the film sealing module achieves the film sealing of the sampled liquid; the conveyor belt waste transfer module comprises a waste transferring belt, a waste transferring motor and a waste transferring baffle; two sides of the waste transferring belt are waste transferring baffles, and the waste transferring motor is disposed on the waste transferring baffle at one side; and one end of the waste transferring belt is also provided with the waste transferring baffle.

Further, the cap removing module, the blood-collection tube grasping module and the pipette module constitute a sampling device, where the blood-collection tube grasping module is arranged on the left side of the pipette module, and the cap removing module is arranged below the pipette module.

The blood-collection tube grasping module comprises a blood-collection tube gripper, a blood-collection tube clamping block, a blood-collection tube grasping guide rail, a blood-collection tube screw motor, a blood-collection tube stepping motor and a blood-collection tube synchronous belt. The blood-collection tube stepping motor and the blood-collection tube synchronous belt are fixed on the side of the pipette module close to the blood-collection tube grasping module, to control other parts of the blood-collection tube grasping module to move in the arrangement direction of the blood-collection tube synchronous belt. The blood-collection tube grasping guide rail is connected and fixed with the blood-collection tube synchronous belt, the blood-collection tube screw motor is fixed on the blood-collection tube grasping guide rail, and the screw rod of the blood-collection tube screw motor is connected to the blood-collection tube gripper, and the blood-collection tube gripper controls the movement of the blood-collection tube clamping block.

The cap removing module comprises a cap removing support block, a cap removing stepping motor, a cap removing reverse screw rod, a cap removing synchronous belt, a cap removing clamping block and a cap removing guide rail. Both ends of the cap removing clamping block are provided with cap removing support blocks, which are connected to the cap removing guide rail through the cap removing reverse screw rod, and the cap removing reverse screw rods at both ends of the cap removing clamping block are connected through the cap removing synchronous belt. The cap removing reverse screw rod is connected to and controlled by the stepping motor, the cap removing clamping block adopts two identical convex blocks, and the longest sides of the two convex blocks clamp the blood-collection tube.

The pipette module comprises a pipette bracket, a four-channel pipette, a pipette isometric conversion module, a pipette guide rail and a pipette Y-axis guide rail. The pipette isometric conversion module is arranged on the side of the pipette bracket away from the blood-collection tube grasping module, the pipette guide rail is arranged on the side of the pipette isometric conversion module away from the blood-collection tube grasping module, the four-channel pipette is arranged on the pipette guide rail, and the pipette Y-axis guide rail is arranged on the pipette bracket to drive the pipette isometric conversion module of the pipette module to move.

Furthermore, the blood-collection tube clamping block are cross-sectional L-shaped clamp blocks symmetrically arranged, and the cross-sectional L-shaped clamp blocks are controlled by the blood-collection tube gripper to move in opposite directions to form clamping force. The blood-collection tube clamping balls are distributed on the blood-collection tube clamping blocks.

Further, a cap removing pressure spring and a cap removing pressing block are arranged in the convex block of the cap removing clamping block, the cap removing pressure spring is fixed in one side away from the longest side of the convex block, and the cap removing pressure spring is connected to the cap removing pressing block.

Further, a cap removing ball screw is arranged in the convex block of the cap removing clamping block, one end of the cap removing ball screw is fixed in one side away from the longest side of the convex block, and the head of the cap removing ball screw is exposed outside the convex block.

Further, the pipette isometric conversion module comprises a pipette isometric conversion bracket, a pipette fixing block, two pipette isometric conversion screw rods and a pipette isometric conversion motor.

Two pipette isometric conversion screw rods are arranged on the pipette isometric conversion bracket, and four pipette fixing blocks are penetrated through the two pipette isometric conversion screw rods, the middle two pipette fixing blocks are controlled by the same pipette isometric conversion screw rods, and the outer two pipette fixing blocks are controlled by another pipette isometric conversion screw rods. The two pipette isometric conversion screw rods are connected to the pipette isometric conversion motor through a conveyor belt. The pipette fixing block is connected to a pipette guide rail; The four modules in the four-channel pipette can move up and down independently, and the TIP heads of each module are moved on the pipette guide rail by the pipette fixing blocks of the pipette isometric changing module.

Further, the handling module comprises a handling bracket, a handling gripper, a handling clamping block, a handling clamping guide rail, a handling screw motor, a handling stepping motor and a handling synchronous belt. The handling stepping motor, the moving synchronous belt is arranged on the handling bracket, and controls other parts of the handling module to move in the handling synchronous belt arrangement direction. The handling clamping guide rail is connected and fixed with the handling synchronous belt, the handling screw motor is fixed on the handling clamping guide rail, and the screw rod of the handling screw motor is connected to handling gripper, and the handling gripper controls the movement of the handling clamping block; and the whole handling clamping block is L-shaped.

The film sealing module comprises a film sealing stepping motor, a film sealing transverse guide rail, a film sealing longitudinal guide rail, a film sealing compression column, a film sealing vacuum airway plate and a film sealing pressure spring. The film sealing module is arranged on the side of the handling bracket of the handling module away from the handling gripper, the film sealing transverse guide rail is fixedly arranged on the handling bracket to control other parts of the film sealing module to move in the arrangement direction of the film sealing transverse guide rail. The film sealing longitudinal guide rail is connected and fixed with the film sealing transverse guide rail, and the film sealing stepping motor is fixed on the film sealing longitudinal guide rail and controls the movement of the film sealing compression column, the film sealing vacuum airway plate and the film sealing pressure spring. The film sealing vacuum airway plate is arranged near one end of the film sealing compression column near the deep-well multi-well plate requiring film sealing, and the film sealing compression column penetrates the film sealing vacuum airway plate.

The other end of the film sealing compression column is fixed on the handling bracket and connected to one end of the film sealing stepping motor, so that the film sealing stepping motor controls the movement of the film sealing compression column, and the film sealing pressure spring is arranged between the film sealing vacuum airway plate and the handling bracket.

The magnetic solid phase extraction module comprises a circular turntable, six uniformly distributed processing stations, a magnetic rack, a sheath, a screw motor matched with the magnetic rack and the sheath, a magnetic solid phase extraction guide rail and a magnetic solid phase extraction scaffold. The screw motor matched with the magnetic rack and the sheath is arranged in the magnetic solid phase extraction scaffold, the magnetic solid phase extraction guide rail is arranged in the longitudinal direction of the magnetic solid phase extraction scaffold, and the magnetic rack and the sheath are arranged on the magnetic solid phase extraction guide rail and move in the longitudinal direction. The magnetic rack is matched with the sheath, and the sheath can cover all the magnetic rods on the magnetic rack. The circular turntable is controlled by an indexing disk, which is arranged below the circular turntable and connected to the circular turntable.

The SPE positive pressure extraction module comprises a positive pressure extraction scaffold, a positive pressure extraction longitudinal control cylinder, a positive pressure extraction longitudinal guide rail, a positive pressure extraction support rod, a positive pressure extraction pressing block, a positive pressure extraction sealing cap, a positive pressure extraction transverse guide rail, a positive pressure extraction bottom plate, a positive pressure extraction screw motor and a positive pressure extraction support plate;

The positive pressure extraction pressing block is arranged above the positive pressure extraction scaffold, and the positive pressure extraction pressing block is connected to the positive pressure extraction scaffold through the positive pressure extraction support rod. The positive pressure extraction longitudinal control cylinder is arranged in the positive pressure extraction scaffold, and the positive pressure extraction longitudinal control cylinder controls the positive pressure extraction pressing block to move in the longitudinal direction.

The positive pressure extraction module further comprises a positive pressure extraction guide plate, two ends of the positive pressure extraction support rod are respectively connected to the fixed positive pressure extraction guide plate and the positive pressure extraction pressing block, the positive pressure extraction guide plate is also provided with a through hole for the positive pressure extraction guide rail to pass through, and the positive pressure extraction guide plate is connected to the positive pressure extraction longitudinal control cylinder.

The positive pressure extraction transverse guide rail is arranged on an upper surface of the positive pressure extraction scaffold, which is connected to and controlled by the positive pressure extraction screw motor; the positive pressure extraction screw motor is arranged on the positive pressure extraction scaffold plate, and the positive pressure extraction scaffold plate is arranged at a position close to the upper surface inside the positive pressure extraction scaffold; the positive pressure extraction bottom plate is arranged on the positive pressure extraction transverse guide rail, and an orifice plate and an SPE plate are placed on the positive pressure extraction bottom plate.

The positive pressure extraction muffler is arranged inside the positive pressure extraction pressing block, a positive pressure extraction sealing ring is arranged at a contact position of the sealing cap of the positive pressure extraction pressing block and the positive pressure extraction pressing block, a positive pressure extraction silicone pad is arranged at the bottom of the positive pressure extraction pressing block, and an air inlet hole is arranged at the central position of the sealing cap of the positive pressure extraction pressing block for nitrogen to enter.

Further, the device further comprises a cover plate, one end of which is connected to the cover plate motor and controlled by the cover plate motor to rotate and block. The cover plate covers the whole magnetic rack.

Further, the device further comprises a heating module, which is arranged below the circular turntable, and the heating module set is arranged at the corresponding position of the station closest to the magnetic solid phase extraction scaffold of the circular turntable.

The heating module is connected to the magnetic solid phase extraction guide rail, the heating module is connected to an oscillating motor, and is controlled by the oscillating motor as a whole.

Provided is a fully automatic sample pretreatment method, which comprises the pretreatment device. The specific operation of the pretreatment method comprises the following steps:

101) pretreatment step: placing a corresponding sample and a corresponding reagent solution on a platform module; and arranging a magnetic solid phase extraction module or replacing it with an SPE positive pressure extraction module as required;

102) cap removing step: clamping the sample blood-collection tube through the blood-collection tube grasping module and transferring the sample blood-collection tube to the cap removing module by a pipette module; fixing the sample blood-collection tube by the cap removing module and removing an upper lid of the blood-collection tube in coordination with the upward movement of the blood-collection tube grasping module;

Specifically, the blood-collection tube is moved from the blood-collection tube grasping module to the cap removing module, the cap removing module clamps and fixes the lower portion of the blood-collection tube, while the blood-collection tube grasping module does not need to clamp the blood-collection tube at this time. The blood-collection tube gripper controls the blood-collection tube clamping block to relax, but the blood-collection tube still stands on the blood-collection tube clamping block, and the blood-collection tube screw motor controls it to move up, thus removing the upper cover of the blood-collection tube and completing the cap removing.

In some embodiments, the method also includes step 103) sampling step: taking out the sample to be sampled in the blood-collection tube fixed by the cap removing module through the pipette module, and moving the sample into the corresponding deep-well multiwell plate by the pipette module;

104) film sealing step: handling the deep-well multiwell plate of the step 103) to a corresponding position by a handling module, and performing film sealing by the film sealing module; in specific, the back and forth movement in the horizontal axis and the longitudinal axis direction is achieved through the film sealing transverse guide rail and the film sealing longitudinal guide rail; at this time, a film sealing vacuum airway plate will move above the required silicone membrane, and then move down to the upper surface of the silicone membrane and cling to the upper surface thereof, continue to move down for a certain distance to keep the sealing film spring in a compressed state, at this time, the upper surface of the silicone membrane is closely attached to the film sealing vacuum airway plate, vacuum is formed under the action of suction of film sealing vacuum airway plate, the silicone membrane is sucked up, and then move directly above the deep-well multiwell plate, moving down to the silicone membrane to come into contact with the deep-well multiwell plate under the action of the sealing film stepping motor, continuously moving down the sealing film vacuum airway plate to press the silicone membrane tightly under the action of the sealing film spring force, and at the same time, in the process of moving down the film sealing compression column again, the silicone membrane is lengthened by boss at the position corresponding to the film sealing compression column so that its diameter is reduced, so as to be press into the deep-well multiwell plate;

105) sample processing step: installing the module magnetic solid phase extraction module or SPE positive pressure extraction module required for performing corresponding processing, and conducting corresponding processing;

when the magnetic solid phase extraction module is selected, the reagent solution in the deep-well multiwell plate is added to the first station of the six processing stations through the corresponding pipette, and the module is rotated at a certain angle every time until all the deep-well multiwell plates in the six processing stations are added. Then, the first station is transferred to the lower portion of the magnetic rack by the circular turntable, and the sheath moves up and down under the action of the screw motor, so that the reagent solution is fully mixed. After the activation of the first station is completed, the sheath moves down to the bottom of the deep-well multiwell plate, and the magnetic rack is controlled to move down to the bottom of the deep-well multiwell plate at the same time. At this time, the magnetic bead solution is adsorbed on the periphery of the sheath, and then the sheath and the magnetic rack start to move up under the action of the screw motor. When the deep-well multiwell plate is moved out, the cover plate rotates under the magnetic rack to protect the solution outside the sheath from falling and polluting other solutions.

The circular turntable rotates again to the deep-well multiwell plate of the next processing station, the cover plate rotates back to the origin, the sheath and the magnetic rack move down to the bottom of the deep-well multiwell plate of the processing station at the same time, the sheath does not move, the magnetic rack moves up to the highest point, and the next operation is not followed.

Then the sheath moves up and down to fully mix the reagent solution, and so on until the mixing in the last deep-well multiwell plate of the six processing stations is completed.

On the other hand, the present disclosure discloses a full-automatic sample pretreatment device, which includes a frame module, a cap removing module, a blood-collection tube grasping module, a pipette module, a platform module, a handling module, a film sealing module, a magnetic solid phase extraction module, an SPE positive pressure extraction module and a conveyor belt waste transfer module. A conveyor belt waste transfer module is arranged at a bottom of the frame module, the cap removing module, the platform module and the magnetic solid phase extraction module are sequentially arranged in the middle of the frame module from left to right, and the blood-collection tube grasping module, the pipette module, the handling module and the film sealing module are arranged at an upper portion of the frame module, wherein the magnetic solid phase extraction module and the SPE positive pressure extraction module are detachable and interchangeable components.

In some embodiments, the cap removing module achieves the fixation of the blood-collection tube, and achieves the cap removing of the blood-collection tube in combination with a part of the blood-collection tube grasping module; the blood-collection tube grasping module achieves grasping the blood-collection tube; the pipette module achieves shifting the corresponding sampled liquid; the handling module achieves the handling of liquid and sample; the film sealing module achieves the film sealing of the sampled liquid; the conveyor belt waste transfer module comprises a waste transferring belt, a waste transferring motor and a waste transferring baffle; two sides of the waste transferring belt are waste transferring baffles, and the waste transferring motor is disposed on the waste transferring baffle at one side; and one end of the waste transferring belt is also provided with the waste transferring baffle.

In some embodiments, the cap removing module, the blood-collection tube grasping module and the pipette module constitute a sampling device, where the blood-collection tube grasping module is arranged on the left side of the pipette module, and the cap removing module is arranged below the pipette module.

In some embodiments, the blood-collection tube grasping module comprises a blood-collection tube gripper, a blood-collection tube clamping block, a blood-collection tube grasping guide rail, a blood-collection tube screw motor, a blood-collection tube stepping motor and a blood-collection tube synchronous belt. The blood-collection tube stepping motor and the blood-collection tube synchronous belt are fixed on the side of the pipette module close to the blood-collection tube grasping module, to control other parts of the blood-collection tube grasping module to move in the arrangement direction of the blood-collection tube synchronous belt. The blood-collection tube grasping guide rail is connected and fixed with the blood-collection tube synchronous belt, the blood-collection tube screw motor is fixed on the blood-collection tube grasping guide rail, and the screw rod of the blood-collection tube screw motor is connected to the blood-collection tube gripper, and the blood-collection tube gripper controls the movement of the blood-collection tube clamping block.

In some embodiments, the cap removing module comprises a cap removing support block, a cap removing stepping motor, a cap removing reverse screw rod, a cap removing synchronous belt, a cap removing clamping block and a cap removing guide rail. Both ends of the cap removing clamping block are provided with cap removing support blocks, which are connected to the cap removing guide rail through the cap removing reverse screw rod, and the cap removing reverse screw rods at both ends of the cap removing clamping block are connected through the cap removing synchronous belt. The cap removing reverse screw rod is connected to and controlled by the stepping motor, the cap removing clamping block adopts two identical convex blocks, and the longest sides of the two convex blocks clamp the blood-collection tube.

In some embodiments, the pipette module comprises a pipette bracket, a four-channel pipette, a pipette isometric conversion module, a pipette guide rail and a pipette Y-axis guide rail. The pipette isometric conversion module is arranged on the side of the pipette bracket away from the blood-collection tube grasping module, the pipette guide rail is arranged on the side of the pipette isometric conversion module away from the blood-collection tube grasping module, the four-channel pipette is arranged on the pipette guide rail, and the pipette Y-axis guide rail is arranged on the pipette bracket to drive the pipette isometric conversion module of the pipette module to move.

In some embodiments, the blood-collection tube clamping block are cross-sectional L-shaped clamp blocks symmetrically arranged, and the cross-sectional L-shaped clamp blocks are controlled by the blood-collection tube gripper to move in opposite directions to form clamping force. The blood-collection tube clamping balls are distributed on the blood-collection tube clamping blocks.

In some embodiments, a cap removing pressure spring and a cap removing pressing block are arranged in the convex block of the cap removing clamping block, the cap removing pressure spring is fixed in one side away from the longest side of the convex block, and the cap removing pressure spring is connected to the cap removing pressing block.

In some embodiments, a cap removing ball screw is arranged in the convex block of the cap removing clamping block, one end of the cap removing ball screw is fixed in one side away from the longest side of the convex block, and the head of the cap removing ball screw is exposed outside the convex block.

In some embodiments, the pipette isometric conversion module comprises a pipette isometric conversion bracket, a pipette fixing block, two pipette isometric conversion screw rods and a pipette isometric conversion motor.

In some embodiments, two pipette isometric conversion screw rods are arranged on the pipette isometric conversion bracket, and four pipette fixing blocks are penetrated through the two pipette isometric conversion screw rods, the middle two pipette fixing blocks are controlled by the same pipette isometric conversion screw rods, and the outer two pipette fixing blocks are controlled by another pipette isometric conversion screw rods. The two pipette isometric conversion screw rods are connected to the pipette isometric conversion motor through a conveyor belt. The pipette fixing block is connected to a pipette guide rail.

In some embodiments, the four modules in the four-channel pipette can move up and down independently, and the TIP heads of each module are moved on the pipette guide rail by the pipette fixing blocks of the pipette isometric changing module.

In some embodiments, the handling module comprises a handling bracket, a handling gripper, a handling clamping block, a handling clamping guide rail, a handling screw motor, a handling stepping motor and a handling synchronous belt. The handling stepping motor, the moving synchronous belt is arranged on the handling bracket, and controls other parts of the handling module to move in the handling synchronous belt arrangement direction. The handling clamping guide rail is connected and fixed with the handling synchronous belt, the handling screw motor is fixed on the handling clamping guide rail, and the screw rod of the handling screw motor is connected to handling gripper, and the handling gripper controls the movement of the handling clamping block; and the whole handling clamping block is L-shaped.

In some embodiments, the film sealing module comprises a film sealing stepping motor, a film sealing transverse guide rail, a film sealing longitudinal guide rail, a film sealing compression column, a film sealing vacuum airway plate and a film sealing pressure spring. The film sealing module is arranged on the side of the handling bracket of the handling module away from the handling gripper, the film sealing transverse guide rail is fixedly arranged on the handling bracket to control other parts of the film sealing module to move in the arrangement direction of the film sealing transverse guide rail. The film sealing longitudinal guide rail is connected and fixed with the film sealing transverse guide rail, and the film sealing stepping motor is fixed on the film sealing longitudinal guide rail and controls the movement of the film sealing compression column, the film sealing vacuum airway plate and the film sealing pressure spring. The film sealing vacuum airway plate is arranged near one end of the film sealing compression column near the deep-well multiwell plate requiring film sealing, and the film sealing compression column penetrates the film sealing vacuum airway plate.

In some embodiments, the other end of the film sealing compression column is fixed on the handling bracket and connected to one end of the film sealing stepping motor, so that the film sealing stepping motor controls the movement of the film sealing compression column, and the film sealing pressure spring is arranged between the film sealing vacuum airway plate and the handling bracket.

In some embodiments, the magnetic solid phase extraction module comprises a circular turntable, six uniformly distributed processing stations, a magnetic rack, a sheath, a screw motor matched with the magnetic rack and the sheath, a magnetic solid phase extraction guide rail and a magnetic solid phase extraction scaffold. The screw motor matched with the magnetic rack and the sheath is arranged in the magnetic solid phase extraction scaffold, the magnetic solid phase extraction guide rail is arranged in the longitudinal direction of the magnetic solid phase extraction scaffold, and the magnetic rack and the sheath are arranged on the magnetic solid phase extraction guide rail and move in the longitudinal direction. The magnetic rack is matched with the sheath, and the sheath can cover all the magnetic rods on the magnetic rack. The circular turntable is controlled by an indexing disk, which is arranged below the circular turntable and connected to the circular turntable.

In some embodiments, the SPE positive pressure extraction module comprises a positive pressure extraction scaffold, a positive pressure extraction longitudinal control cylinder, a positive pressure extraction longitudinal guide rail, a positive pressure extraction support rod, a positive pressure extraction pressing block, a positive pressure extraction sealing cap, a positive pressure extraction transverse guide rail, a positive pressure extraction bottom plate, a positive pressure extraction screw motor and a positive pressure extraction support plate.

In some embodiments, the positive pressure extraction pressing block is arranged above the positive pressure extraction scaffold, and the positive pressure extraction pressing block is connected to the positive pressure extraction scaffold through the positive pressure extraction support rod. The positive pressure extraction longitudinal control cylinder is arranged in the positive pressure extraction scaffold, and the positive pressure extraction longitudinal control cylinder controls the positive pressure extraction pressing block to move in the longitudinal direction.

In some embodiments, the device further comprises a positive pressure extraction guide plate, two ends of the positive pressure extraction support rod are respectively connected to the fixed positive pressure extraction guide plate and the positive pressure extraction pressing block, the positive pressure extraction guide plate is also provided with a through hole for the positive pressure extraction guide rail to pass through, and the positive pressure extraction guide plate is connected to the positive pressure extraction longitudinal control cylinder.

In some embodiments, the positive pressure extraction transverse guide rail is arranged on an upper surface of the positive pressure extraction scaffold, which is connected to and controlled by the positive pressure extraction screw motor; the positive pressure extraction screw motor is arranged on the positive pressure extraction scaffold plate, and the positive pressure extraction scaffold plate is arranged at a position close to the upper surface inside the positive pressure extraction scaffold; the positive pressure extraction bottom plate is arranged on the positive pressure extraction transverse guide rail, and an orifice plate and an SPE plate are placed on the positive pressure extraction bottom plate.

In some embodiments, the positive pressure extraction muffler is arranged inside the positive pressure extraction pressing block, a positive pressure extraction sealing ring is arranged at a contact position of the sealing cap of the positive pressure extraction pressing block and the positive pressure extraction pressing block, a positive pressure extraction silicone pad is arranged at the bottom of the positive pressure extraction pressing block, and an air inlet hole is arranged at the central position of the sealing cap of the positive pressure extraction pressing block for nitrogen to enter.

In some embodiments, the device further comprises a cover plate, one end of which is connected to the cover plate motor and controlled by the cover plate motor to rotate and block. The cover plate covers the whole magnetic rack.

In some embodiments, the device further comprises a heating module, which is arranged below the circular turntable, and the heating module set is arranged at the corresponding position of the station closest to the magnetic solid phase extraction scaffold of the circular turntable.

In some embodiments, the heating module is connected to the magnetic solid phase extraction guide rail, the heating module is connected to an oscillating motor, and is controlled by the oscillating motor as a whole.

The advantages of the present disclosure characterized:

According to the present disclosure, with the cooperation of the cap removing module, the blood-collection tube grasping module and the pipette module, it achieves that the blood-collection tube is moved from the sample placement position to the corresponding cap removing module by the pipette module and the blood-collection tube grasping module, and the cap removing module and the blood-collection tube grasping module cooperate to remove the cap, and then the internal sample is taken out by the pipette module and put into the corresponding reaction liquid.

In order to improve the clamping force of the blood-collection tube clamping block, and avoid falling off, the blood-collection tube clamping block adopts cross-sectional L-shaped clamp blocks symmetrically arranged, which is controlled by the blood-collection tube gripper to move opposite to form clamping force, and since the upper portion of the blood-collection tube has obvious protruding part, it can be mounted on the cross-sectional L-shaped clamp blocks, thus better avoiding falling off caused by not clamping. The blood-collection tube clamping balls are distributed on the blood-collection tube clamping blocks, and better clamping is achieved through the ball screws.

In the present disclosure, the blood-collection tube is moved from the blood-collection tube grasping module to the cap removing module, the cap removing module clamps and fixes the lower portion of the blood-collection tube, while the blood-collection tube grasping module does not need to clamp the blood-collection tube at this time. The blood-collection tube gripper controls the blood-collection tube clamping block to relax, but the blood-collection tube still stands on the blood-collection tube clamping block, and the blood-collection tube screw motor controls it to move up, thus removing the upper cover of the blood-collection tube and completing the cap removing. The present disclosure makes full use of the blood-collection tube gripping module to achieve dual function and reduces the corresponding mechanical structure.

The pipette isometric conversion module of the present disclosure achieves fine-tuning control of four pipette fixing blocks by ingeniously arranging two pipette isometric conversion screw rods, which greatly reduces mechanical complexity, improves stability, and can achieve feeding and pipette operations in more complex environments.

In the present disclosure, when the automatic design of magnetic solid phase extraction is carried out, the operation of the six processing steps is achieved through an ingenious arrangement of circular turntable, and the six processing steps are performed with one processing tool, which greatly reduces mechanical complexity and improves stability.

The present disclosure achieves the effect that the reagent solution in the 96 deep-well multiwell plate is added to the first station (activation processing station) of the six processing stations through a corresponding pipette, and the deep-well multiwell plate is rotated at a certain angle every time after adding until all the 96 deep-well multiwell plates in the six processing stations are added. Then the first station (activation station) is transferred to the lower portion of the magnetic rack by the circular turntable, and the sheath moves up and down under the action of the screw motor, so that the reagent solution is fully mixed. After the activation of the first station is completed, the sheath moves down to the bottom of the 96 deep-well multiwell plate, and the magnetic rack is controlled to move down to the bottom of the 96 deep-well multiwell plate at the same time. At this time, the magnetic bead solution is adsorbed on the periphery of the sheath, and then the sheath and the magnetic rack start to move up under the action of the screw motor 45. When the 96 deep-well multiwell plate is moved out, the cover plate rotates under the magnetic rack to protect the solution outside the sheath from falling and polluting other solutions.

By arranging a heating module under the corresponding circular turntable, the heating module can move up and down for heating when the station to be heated moves to the position.

In the present disclosure, the back and forth movement in the horizontal axis and the longitudinal axis direction is achieved through the film sealing transverse guide rail and the film sealing longitudinal guide rail; at this time, a film sealing vacuum airway plate will move above the required silicone membrane, and then move down to the upper surface of the silicone membrane and cling to the upper surface thereof, continue to move down for a certain distance to keep the sealing film spring in a compressed state, at this time, the upper surface of the silicone membrane is closely attached to the film sealing vacuum airway plate, vacuum is formed under the action of suction of film sealing vacuum airway plate, the silicone membrane is sucked up, and then move directly above the 96 deep-well multiwell plate, moving down to the silicone membrane to come into contact with the 96 deep-well multiwell plate under the action of the sealing film stepping motor, continuously moving down the sealing film vacuum airway plate to press the silicone membrane tightly under the action of the sealing film spring force, and at the same time, in the process of moving down the film sealing compression column again, the silicone membrane is lengthened by boss at the position corresponding to the film sealing compression column so that its diameter is reduced, so as to be press into the 96 deep-well multiwell plate easily.

The present disclosure has the advantages of simple structure, reasonable design, high stability, full automatic film sealing and can be handled to the next treatment process. A boss is arranged at the corresponding position of the sealing silica gel and the deep-well multiwell plate, and the diameter of the boss is larger than the hole diameter of the deep-well multiwell plate, so as to better seal the film.

Figure 1:
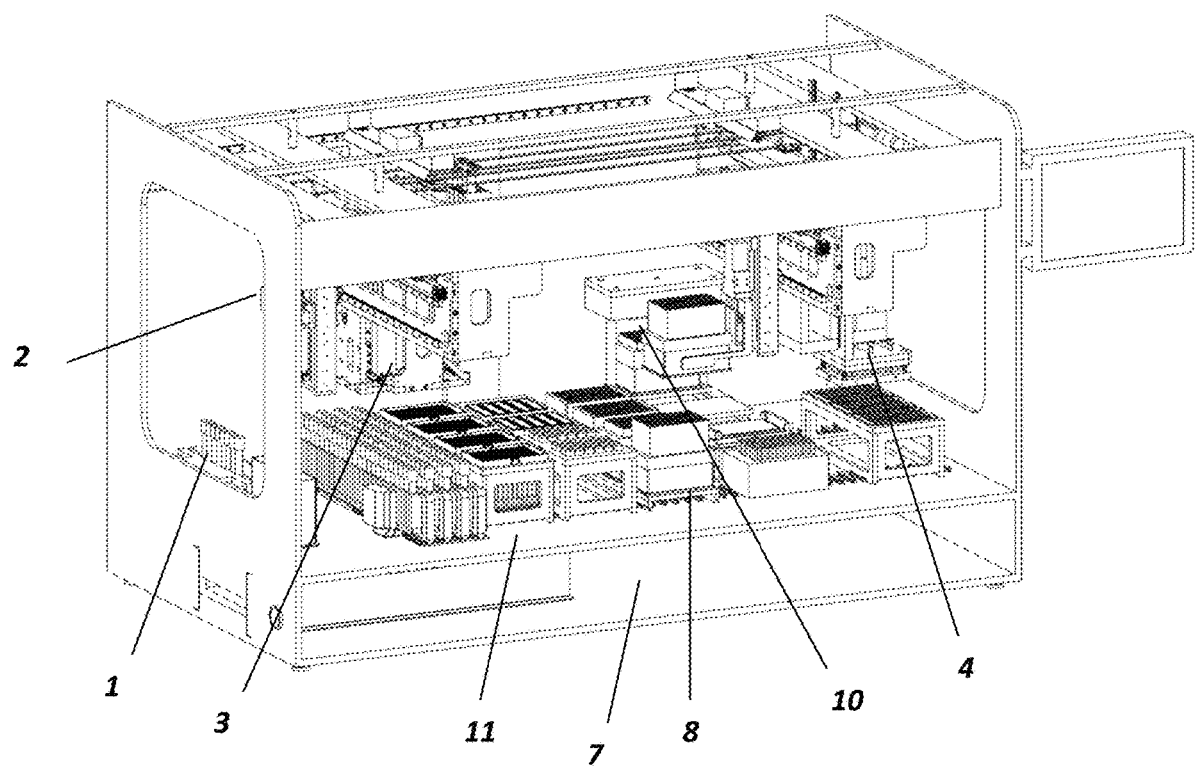
FIG. 1 is an overall schematic diagram of an SPE positive pressure extraction module according to the present disclosure.
Figure 2:
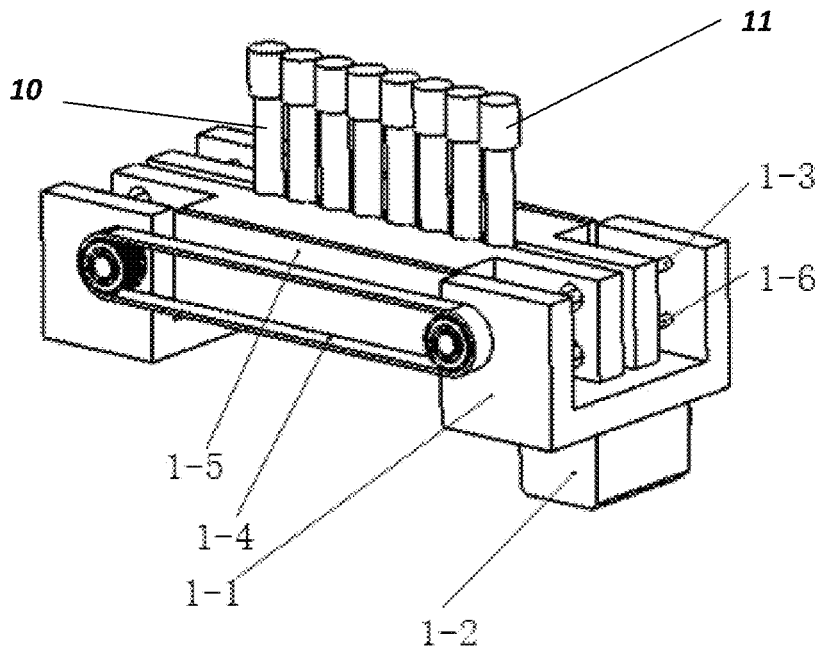
FIG. 2 is a schematic diagram of the cap removing module (fixing module for fixing test tubes) according to the present disclosure.

Reference signs in the drawings: cap removing module 1, blood-collection tube grasping module 2, pipette module 3, film sealing module 4, handling module 5, magnetic solid phase extraction module 6, frame module 7, platform module 8, SPE positive pressure extraction module 10, conveyor belt waste transfer module 11;

cap removing supporting block 1-1, cap removing stepping motor 1-2, cap removing reverse screw rod 1-3, cap removing synchronous belt 1-4, cap removing clamping block 1-5, cap removing guide rail 1-6, cap removing pressure spring 1-7 and cap removing pressing block 1-8;

blood-collection tube 2-1, blood-collection tube clamping block 2-2, blood-collection tube grasping guide rail 2-3, blood-collection tube screw motor 2-4, blood-collection tube stepping motor 2-5, and blood-collection tube synchronous belt 2-6;

pipette bracket 3-1, four-channel pipette 3-2, pipette isometric conversion module 3-3, pipette isometric conversion bracket 3-31, pipette fixing block 3-32, two pipette isometric conversion screw rods 3-33, pipette isometric conversion motor 3-34, pipette guide rail 3-4 and pipette Y-axis guide rail 3-5;

film sealing stepping motor 4-1, film sealing transverse guide rail 4-2, film sealing longitudinal guide rail 4-3, film sealing compression column 4-4, film sealing vacuum airway plate 4-5, film sealing pressure spring 4-6 and silicone membrane 4-7;

handling gripper 5-1, handling clamping block, handling clamping guide rail 5-3, handling screw motor 5-4, handling stepping motor 5-5, handling synchronous belt 5-6 and handling bracket 5-7;

circular turntable 6-1, processing station 6-2, sheath 6-3, screw motor 6-4, magnetic solid phase extraction guide rail 6-5, magnetic solid phase extraction scaffold 6-6, cover plate 6-7, heating module 6-8 and magnetic bracket 6-9;

positive pressure extraction scaffold, positive pressure extraction longitudinal control cylinder 10-2, positive pressure extraction longitudinal guide rail 10-3, positive pressure extraction support rod 10-4, positive pressure extraction pressing block 10-5, positive pressure extraction sealing cap 10-6, positive pressure extraction transverse guide rail 10-7, positive pressure extraction bottom plate 10-8, positive pressure extraction screw motor 10-9, positive pressure extraction support plate 10-10, positive pressure extraction muffler 10-11, positive pressure extraction sealing ring 10-12 and positive pressure extraction silicone pad 10-13;

waste transferring belt 11-1 and waste transferring baffle 11-3.

DETAILED DESCRIPTION OF THE INVENTION

The present disclosure will be further explained in conjunction with the drawings and the detailed embodiments below. It should be understood that the detailed embodiments described herein are intended to explain the present disclosure only and are not intended to limit the present disclosure.

Determination

Determination means assaying or testing for the presence of a substance or material, such as, but not limited to, a chemical, an organic compound, an inorganic compound, a metabolite, a drug or a drug metabolite, an organic tissue or a metabolite of an organic tissue, a nucleic acid, a protein, or a polymer. In addition, Determination indicates the amount of substance or material tested. Furthermore, the assay also means immunoassay, chemical assay, enzyme assay, high performance liquid chromatography tandem mass spectrometry (HPLC-MSIMS) and so on.

Specimen or Sample

Samples of the detection device of the present disclosure include biological fluids (e.g., case fluids or clinical samples). The "sample" and "sample" of the present disclosure mean the same and are interchangeable. Liquid or fluid samples can come from solid or semi-solid samples, including excreta, biological tissues and food samples. Solid or semi-solid samples can be converted into liquid samples by any suitable method, such as mixing, mashing, soaking, incubating, dissolving or digesting solid samples by enzymatic hydrolysis in a suitable solution (e.g., water, phosphate solution or other buffer solution). "Biological samples" include samples of animal, plant and food origin, including, for example, urine, saliva, blood and its modules, spinal fluid, vaginal secretions, sperm, feces, sweat, secretions, tissues, organs, tumors, cultures of tissues and organs, cell cultures and media of human or animal origin. The preferred biological sample is urine, and the preferred biological sample is blood. Food samples include food processing substances, end products, meat, cheese, wine, milk and drinking water. Plant samples include cultures and media derived from any plant, plant tissue, plant cell. "Environmental samples" come from the environment (e.g., liquid samples from lakes or other bodies of water, sewage samples, soil samples, groundwater, seawater and waste liquid samples). Environmental samples may also include sewage or other wastewater.

As shown in FIGS. 1 to 18, a full-automatic sample pretreatment device comprises a module for automatically cap removal, the module for automatically cap removal includes a cap removing fixing module 1 for fixing a test tube body and a blood-collection tube grasping module 2. In some embodiments, the device further includes a pipette module 3 for drawing a sample from the blood-collection tube. In some embodiments, the device further includes a film sealing module 4, which achieves automatic film sealing treatment of a 96 deep-well multiwell plate. In some embodiments, the device further includes a magnetic solid phase extraction module 6 or an SPE positive pressure extraction module 10 for extracting the sample. In some embodiments, the device also includes a frame module 7, a platform module 8, a handling module 5, and a conveyor belt waste transfer module 11. A conveyor belt waste transfer module 11 is arranged at the bottom of the frame module 7. The cap removing module 1, the platform module 8 and the magnetic solid phase extraction module 6 are sequentially arranged in the middle of the frame module 7 from left to right, and the blood-collection tube grasping module 2, the pipette module 3, the handling module 5 and the film sealing module 4 are arranged at an upper portion of the frame module 7. The magnetic solid phase extraction module 6 and the SPE positive pressure extraction module 10 are detachable and interchangeable components.

The "blood-collection tube" herein is not limited to the tube body for taking blood samples. It may also include a tube body that is any sample, For example, a test tube, where "blood-collection tube" and "test tube" can be interchanged, is a tube body for storing liquid samples, such as urine, saliva, etc. Any sample within the meaning of "sample or specimen" defined above can be a sample that can be stored in the blood-collection tube of the present disclosure, not just a blood sample.

In some embodiments, the blood-collection tube grasping module 2 achieves grasping the blood-collection tube; the pipette module 3 achieves shifting the corresponding sampled liquid; the handling module 5 achieves the handling of liquid and sample; the film sealing module 4 achieves the film sealing of the sampled liquid; the conveyor belt waste transfer module 11 comprises a waste transferring belt 11-1, a waste transferring motor and a waste transferring baffle 11-3; two sides of the waste transferring belt 11-1 are waste transferring baffles 11-3, and the waste transferring motor is disposed on the waste transferring baffle 11-3 at one side; and one end of the waste transferring belt 11-1 is also provided with the waste transferring baffle 11-3. The conveyor belt waste transfer module 11 comprises a waste transferring belt 11-1, a waste transferring motor and a waste transferring baffle 11-3; two sides of the waste transferring belt 11-1 are waste transferring baffles 11-3, and the waste transferring motor is disposed on the waste transferring baffle 11-3 at one side. One end of the waste transferring belt 11-1 is also provided with the waste transferring baffle 11-3.

The specific opening process is described in detail below.

In some embodiments, the cap removing module 1 enables the fixing of the blood-collection tube, and in conjunction with the partial blood-collection tube grasping module 2 enables the cap removing of the blood-collection tube. That is, the blood-collection tube grasping module 2 is matched with the fixing module of the cap removing module 1 for fixing the blood-collection tube, so as to achieve the cap removing of the blood-collection tube. Specifically, the blood-collection tube grasping module 2 is used for grasping one end of the blood-collection tube with a cap, and the cap removing module 1 is used for fixing at the position of the lower portion or the lower middle portion of the cap end of the blood-collection tube, so that the cap body can be detached when the longitudinal movement is achieved. Herein, the longitudinal movement can be that the cap removing module 1 does not move, while the grasping module moves upward, or the grasping module does not move, while the cap removing module 1 moves relatively downward, or the cap removing module 1 and the grasping module 2 move relatively in opposite reverse directions, all of which can achieve the separation of the cap.

Specifically, the sampling device comprises the cap removing component 1 and the blood-collection tube grasping module 2. The cap removing module may also include the pipette module 3. The blood-collection tube grasping module 2 is arranged on the left side of the pipette module 3, and the cap removing module 1 is arranged below the pipette module 3. With the cooperation of the cap removing module 1, the blood-collection tube grasping module 2 and the pipette module 3, it achieves the effect that the blood-collection tube is moved from the sample placement position to the corresponding cap removing module 1 by the pipette module 3 and the blood-collection tube grasping module 2, and the cap removing module 1 and the blood-collection tube grasping module 2 cooperate to remove the cap, and then the internal sample is taken out by the pipette module 3 and put into the corresponding reaction liquid. Here, it is mainly considered that the pipette module sucks the samples in the blood-collection tube after the cap body is detached. Therefore, the preferred way is that the pipette module moves together with the blood-collection tube grasping module 2, so that the blood-collection tube is inserted into the cap removing module 1 for fixation, so as to achieve the detachment of the cap body. After detachment, the pipette module moves above the blood-collection tube and is inserted into the blood-collection tube to suck blood samples. Certainly, it can be a blood sample, or a urine sample, and it can also include any other liquid sample.

Generally, the blood-collection tube is a rubber plug of the cap, and the tube body is made of glass or hard plastic. The cap tightly seals the opening of the blood-collection tube, so it is laborious and inefficient to manually detach the cap, which requires a special automatic opening structure to open the cap. Specifically, the blood-collection tube is grasped by a manipulator, and the blood-collection tube is tightened while grasping, and the position of gripping is the outer edge of the cap, and the clamping mechanism tightly clamp the place where the outer edge of the cap is separated from the tube body, so that the blood-collection tube can move, also it is possible to prepare the subsequent removal of the cap. However, the tightening structure of the blood-collection tube relatively fixes the blood-collection tube body, to allow the blood-collection tube to be in the tightening state, so that the cap is removed from the blood-collection tube by the longitudinal movement of the grasping module, which achieves the removal of the cap.

Figure 7:
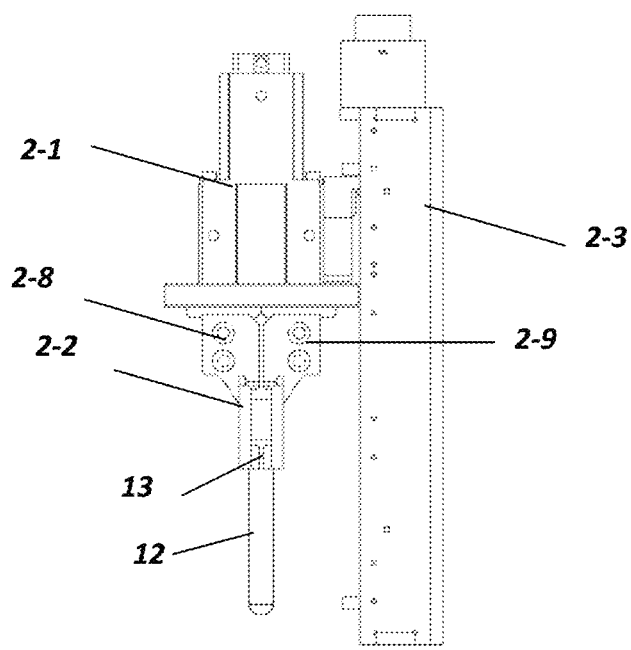
FIG. 7 is a partial cross-sectional view of the blood-collection tube grasping module according to the present disclosure.
Figure 8:
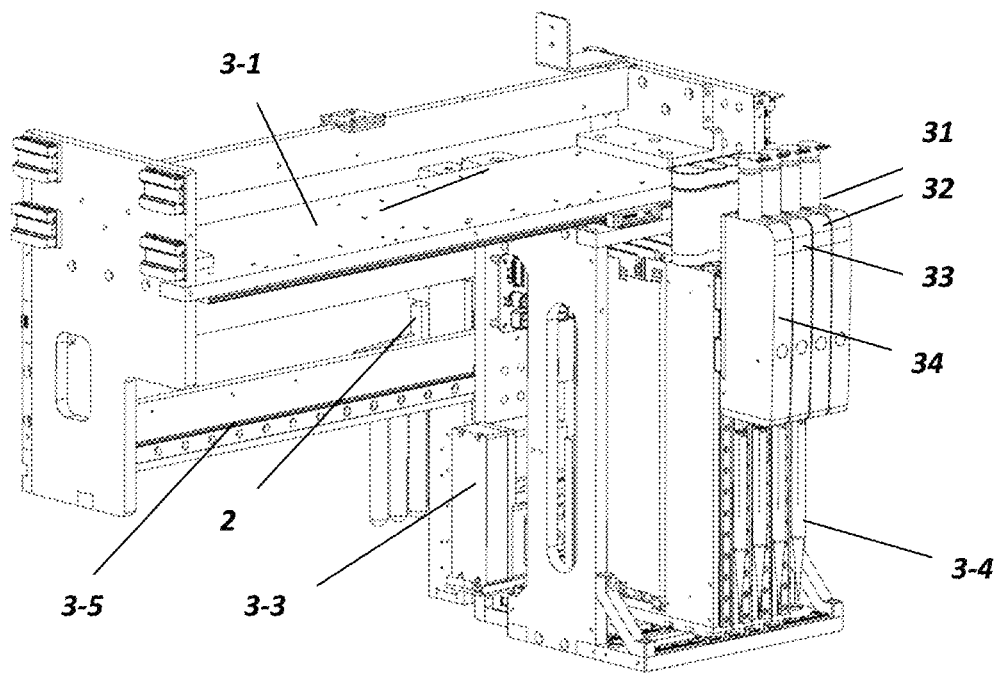
FIG. 8 is a schematic diagram of the pipette module according to the present disclosure.
Figure 9:
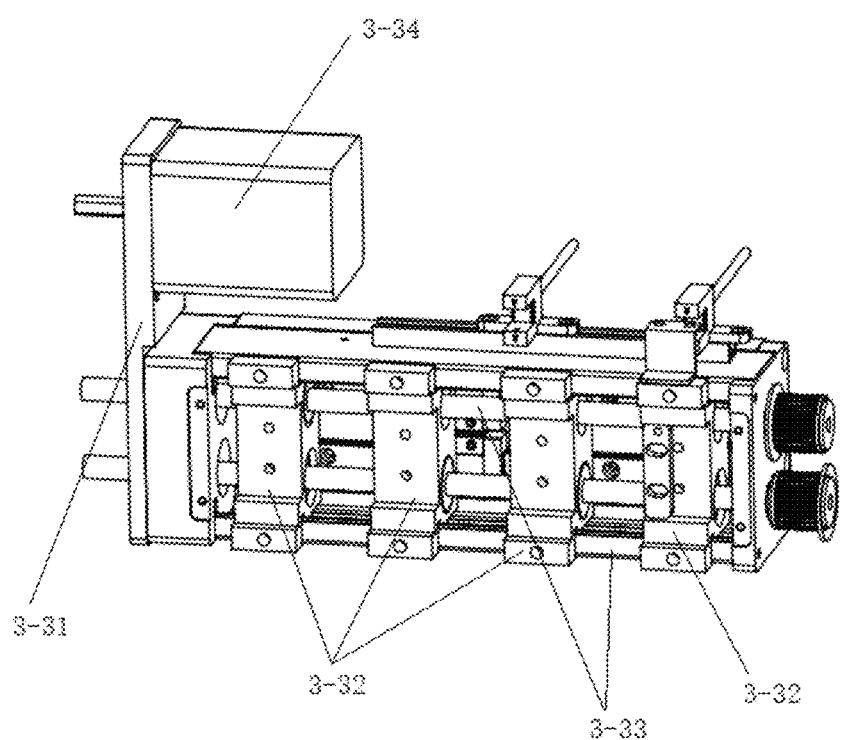
FIG. 9 is a schematic diagram of a pipette isometric conversion module according to the present disclosure.

Therefore, in some embodiments, the blood-collection tube grasping module 2 includes a blood-collection tube gripper 2-1, and a blood-collection tube clamping block 2-2. In order to improve the clamping force of the blood-collection tube clamping block, and avoid falling off, the blood-collection tube clamping block adopts cross-sectional L-shaped clamp blocks 22 symmetrically arranged, which is controlled by the blood-collection tube gripper 2-1 to move opposite to form clamping force, and since the upper portion of the blood-collection tube has obvious protruding part (the cap) 11, it can be mounted on the cross-sectional L-shaped clamp blocks, thus better avoiding falling off caused by not clamping. As a preferred solution, the blood-collection tube clamping balls can also be distributed on the blood-collection tube clamping blocks, and better clamping is achieved through the ball screws. Ball screws are naturally arranged at the point below the obvious protruding (cap) part of the blood-collection tube. As shown in FIG. 7, such tightening is mainly to prevent the protruding part from loosening due to the upward pulling force when the tube body is fixed and the cap is removed, thus failing to achieve the function of removing the cap.

In order to achieve more automation, in some embodiments, a blood-collection tube grasping guide rail 2-3, a blood-collection tube screw motor 2-4, a blood-collection tube stepping motor 2-5 and a blood-collection tube synchronization belt 2-6 are also provided. The blood-collection tube stepping motor 2-5 and the blood-collection tube synchronizing belt 2-6 are fixed on the side of the pipette module 3 close to the blood-collection tube grasping module 2, and control other components of the blood-collection tube grasping module 2 to move in the arrangement direction of the blood-collection tube synchronizing belt 2-6. The blood-collection tube grasping guide rail 2-3 is connected and fixed with the blood-collection tube synchronous belt 2-6, the blood-collection tube screw motor 2-4 is fixed on the blood-collection tube grasping guide rail 2-3, the screw rod of the blood-collection tube screw motor 2-4 is connected to the blood-collection tube gripper 2-1, and the blood-collection tube gripper 2-1 controls the movement of the blood-collection tube clamping block.

That is, the blood-collection tube clamping block 2-2 is controlled by the blood-collection tube gripper 2-1 to tightly grasp the blood-collection tubes from the sample rack every time, generally grasping eight or more blood-collection tubes at a time. The blood-collection tube synchronizing belt 2-6 is controlled by the blood-collection tube stepping motor 2-5, and the blood-collection tube grasping guide rail 2-3 connected to the blood-collection tube synchronizing belt is moved in the transverse direction to move the position in the transverse direction. The blood-collection tube screw motor 2-4 controls the blood-collection tube gripper 2-1 to move (longitudinally) on the blood-collection tube grasping guide rail 2-3, and then the pipette module 3 drives the whole blood-collection tube grasping module 2 to translate, thereby allowing the blood-collection tube to move to the cap removing module 1. In fact, it is the control of mechanical mechanism and motor that makes the blood-collection tube gripper 2-1 achieve the lateral translation of the blood-collection tube to move up and down longitudinally. Because the pipette module draws samples from the blood-collection tube, it is generally designed close to each other. Of course, it is not necessary to rely on the pipette module to drive the whole movement of the blood-collection tube grasping module 2, or other components can drive the whole of the blood-collection tube grasping module 2 to the cap removing module.

Figure 3:
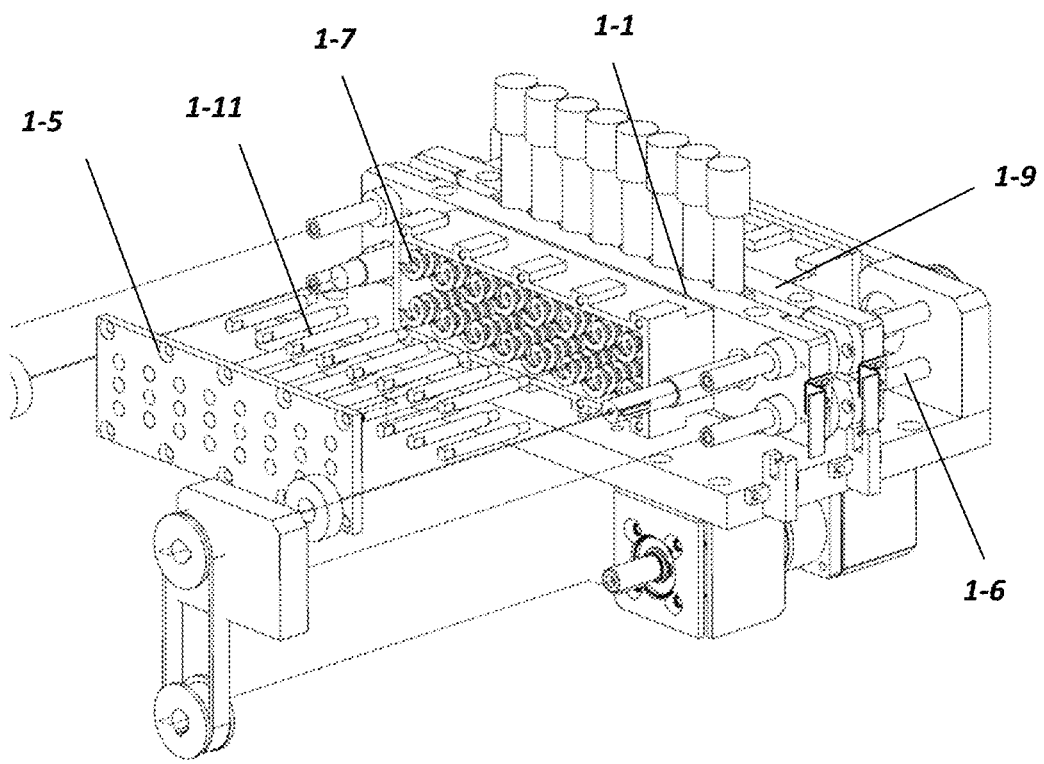
FIG. 3 is a decomposed structural schematic diagram of the fixing module of the cap removing module for fixing the test tube according to the present disclosure.

The cap removing module 1 is used for fixing the blood-collection tube, specifically as shown in FIG. 3. The cap removing module mainly includes a body for fixing the blood-collection tube so that it is fixed. Specifically, the module comprises a cap removing supporting block 1-1, a cap removing stepping motor 1-2, a cap removing reverse screw rod 1-3, a cap removing synchronous belt 1-4, a cap removing clamping block 1-5 and a cap removing guide rail 1-6. Both ends of the cap removing clamping block 1-5 are provided with the cap removing supporting blocks 1-1, which are connected by the cap removing reverse screw rods 1-3 and the cap removing guide rail 1-6, and the cap removing reverse screw rods 1-3 at both ends of the cap removing clamping block 1-5 are connected by the cap removing synchronous belt 1-4. The cap removing reverse screw rod 1-3 is connected to and controlled by the stepping motor, and with the movement of the reverse screw rod, the distance between the clamping blocks is reduced, thereby achieving the fixation of the blood-collection tube. The cap removing clamping blocks 1-5 are two identical convex blocks, and the blood-collection tube is clamped between the longest sides of the two convex blocks. That is to say, the cap removing module 1 controls the rotation of the cap removing reverse screw rod 1-3 by the cap removing stepping motor 1-2, and controls the clamping movement of the cap removing clamping blocks 1-5, thereby achieving the effective clamping of the blood-collection tube. In fact, the cap removing function is achieved by slowly moving up the blood-collection tube grasping module 2. That is, the blood-collection tube is moved from the blood-collection tube grasping module 2 to the cap removing module 1, the cap removing module 1 clamps and fixes the lower portion of the blood-collection tube, while the blood-collection tube grasping module 2 does not need to clamp the blood-collection tube at this time. The blood-collection tube gripper 2-1 controls the blood-collection tube clamping blocks to relax, but the blood-collection tube still stands on the blood-collection tube clamping blocks, and the blood-collection tube screw motor 2-4 controls them to move up, thus removing the upper cover of the blood-collection tube and completing the cap removing. The present disclosure makes full use of the blood-collection tube gripping module 2 to achieve dual function and reduces the corresponding mechanical structure. In fact, as mentioned earlier, one of that function of the blood-collection tube gripping module 2 is to achieve the movement of the blood-collection tube. In addition, when it is moved to the cap removing module 1 and fixed, it can directly move upward to make the cap detach, so that it does not necessarily need the tightening work of grasping the module and does not need clamping, but the L-shaped clamping blocks are still located at the lower portion of the cap, so that it can move upward to make the cap detach from the blood-collection tube.

Figure 4:
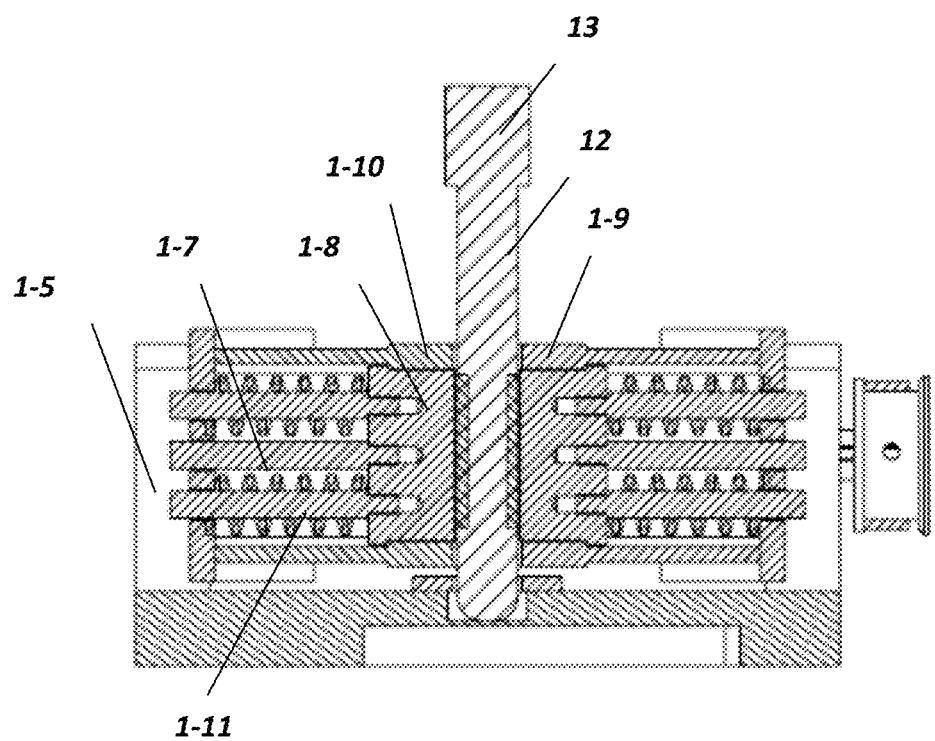
FIG. 4 is a cross-sectional view of the fixing module of the cap removing module for fixing the test tube according to the present disclosure.
Figure 5:
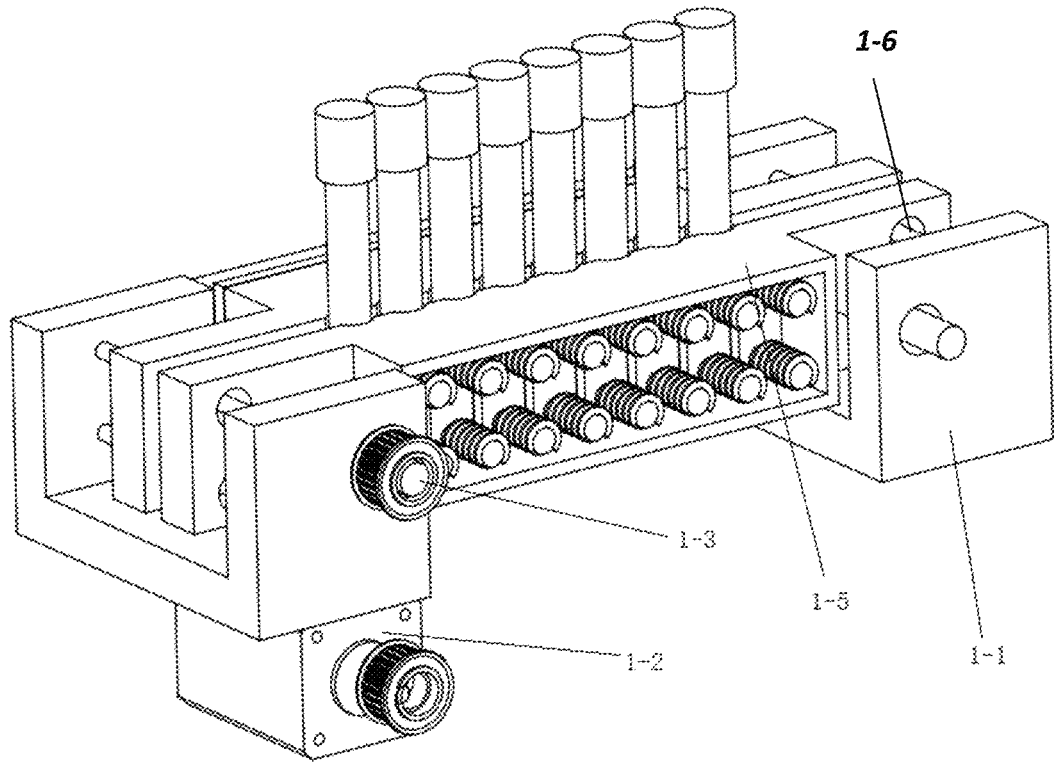
FIG. 5 is a perspective view of the fixing module from another angle.
Figure 6:
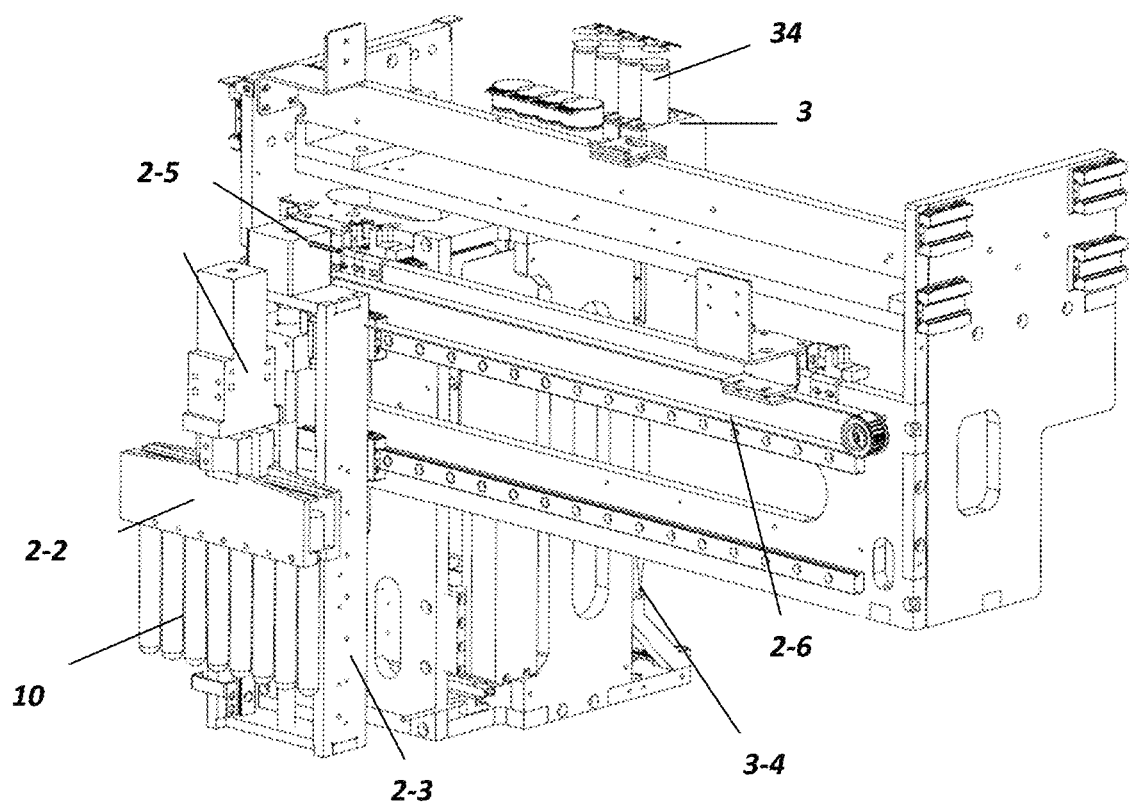
FIG. 6 is a schematic diagram of a blood-collection tube grasping module and a pipette module according to the present disclosure.

As a preferred way, as shown in FIG. 4, a cap removing pressure spring 1-7 and a cap removing pressing block 1-8 are arranged in the convex block of the cap removing clamping block 1-5, the cap removing pressure spring 1-7 is fixed in a side away from the longest side 1-6 of the convex block, and the cap removing pressure spring 1-7 is connected to the cap removing pressing block 1-8. That is, some arc-shaped grooves are arranged on the cap removing pressing blocks 1-8 to better limit the blood-collection tubes, and under the action that the cap removing pressing block 1-8 is pushed by the cap removing pressure spring 1-7 to achieve secondary clamping or double clamping on the original clamping force (generated by the pressure spring 1-7 between the convex blocks on the blood-collection tube), the blood-collection tube can be fixed. The so-called fixing is that when the L-shaped clamping blocks move upward, the cap 11 is detached from the blood-collection tube, but the blood-collection tube body 10 is kept fixed, so that the cap is more easily detached. Protruding points can be distributed at corresponding positions of the cap removing pressing blocks 1-8 to increase friction or rubber parts can be arranged. Of course, a cap removing ball screw can also be arranged in the convex blocks of the cap removing clamping block 1-5, one end of the cap removing ball screw is fixed in one side away from the longest side of the convex block, and the head of the cap removing ball screw is exposed outside the convex block. The clamping is better achieved by the cap removing ball screw.

Sample Drawing Process after Cap Removal

The pipette module 3 includes a plurality of pipette tips and includes a mechanism capable of automatically adjusting the distance between the plurality of pipette tips. Specifically, the pipette module comprises a pipette bracket 3-1, a four-channel pipette 3-2, a pipette isometric conversion module 3-3, a pipette guide rail 3-4, and a pipette Y-axis guide rail 3-5. The pipette isometric conversion module 3-3 is arranged on the side of the pipette bracket 3-1 away from the blood-collection tube grasping module 2, the pipette guide rail 3-4 is arranged on the side of the pipette isometric conversion module 3-3 away from the blood-collection tube grasping module 2, the four-channel pipette 3-2 is arranged on the pipette guide rail 3-4, and the pipette Y-axis guide rail 3-5 is arranged on the pipette bracket 3-1 to drive the pipette isometric conversion module 3-3 of the pipette module 3 to move. That is, the movement of the four-channel pipette 3-2, the pipette isometric conversion module 3-3 and the pipette guide 3-4 in the Y-axis direction is achieved by controlling the pipette Y-axis guide 3-5 by a corresponding motor (not mentioned herein), And the movement of the four-channel pipette 3-2 in the longitudinal axis direction is controlled by the pipette guide rail 3-4 (which is naturally controlled by a corresponding motor, and the prior art will not be described in detail), wherein the pipette isometric conversion module 3-3 can control the four-channel pipette 3-2 to locally achieve fine adjustment in the Y-axis direction. That is to say, each module (31, 32, 33, 34) of the four-channel pipette 3-2 can drive a single pipette to move up and down independently, and the TIP tips (pipette tips for drawing liquid) of each module are spaced apart, so that it can be changed on the pipette guide rail 3-4 by the pipette isometric conversion module, and the change range is between 18 mm and 36 mm Structurally, the pipette fixing blocks 3-32 of the pipette isometric conversion module 3-3 are moved on the pipette guide rail 3-4 at intervals between the TIP tips of each module. The distances between the same pipette tips are adjusted properly, and they can be moved down together, inserted into the test tube, and can draw multiple samples at one time, or inserted into the deep hole of the perforated plate to draw samples. Generally, the distance between deep holes of perforated plates is the same, however, the distance between the pipettes is not necessarily the same as the distance between the deep holes of the perforated plate due to mechanical errors. Therefore, when inserting the pipette tips into the holes to draw the samples, it is necessary to fine-tune the distance to ensure that the pipettes are accurately inserted into the perforated plates to draw liquid samples. Alternatively, these pipettes need to be inserted into the blood-collection tube to absorb the sample, and then inserted into the deep hole of the perforated plate to release the sample into the deep hole. Therefore, as mentioned earlier, the tube cap removing module generally moves at the same time as the pipette module.

Specifically, the pipette isometric conversion module 3-3 comprises a pipette isometric conversion bracket 3-31, a pipette fixing block 3-32, two pipette isometric conversion screw rods 3-33 and a pipette isometric conversion motor 3-34.

Two pipette isometric conversion screw rods 3-33 are arranged on the pipette isometric conversion bracket 3-31, the two pipette isometric conversion screw rods 3-33 run through four pipette fixing blocks 3-32, two pipette fixing blocks 3-32 in the middle are controlled by one of the two pipette isometric conversion screw rods, two pipette fixing blocks 3-32 on an outer side are controlled by another one of the two pipette isometric conversion screw rods. In order to confirm the position of the pipette fixing block 3-32, sensors can be arranged at the corresponding positions to limit movement.

The two pipette isometric conversion screw rods 3-33 are connected to the pipette isometric conversion motor 3-34 through a conveyor belt. The pipette fixing block 3-32 is connected to the pipette guide rail 3-4. The pipette isometric conversion module 3-3 of the fine-tuning control of four pipette fixing blocks 3-32 by ingeniously arranging two pipette isometric conversion screw rods 3-33, which greatly reduces mechanical complexity, improves stability, and can achieve feeding and pipette operations in more complex environments. (diagrams pf separately enlarging structures 3-2, 3-4, 3-3)

Filing Sealing of Perforated Plate

Figure 10A:
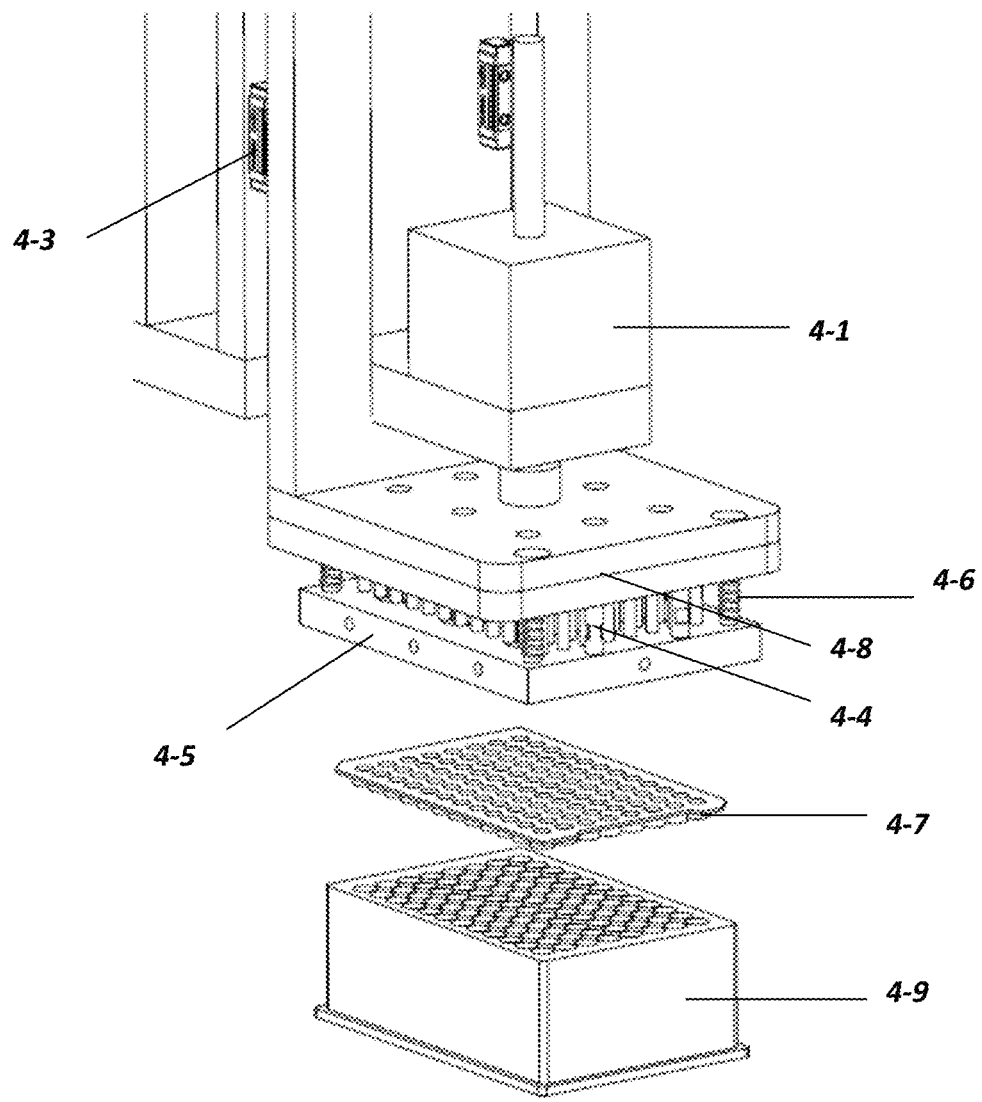
FIG. 10A is an overall schematic diagram of a film sealing module according to the present disclosure.
Figure 10B:
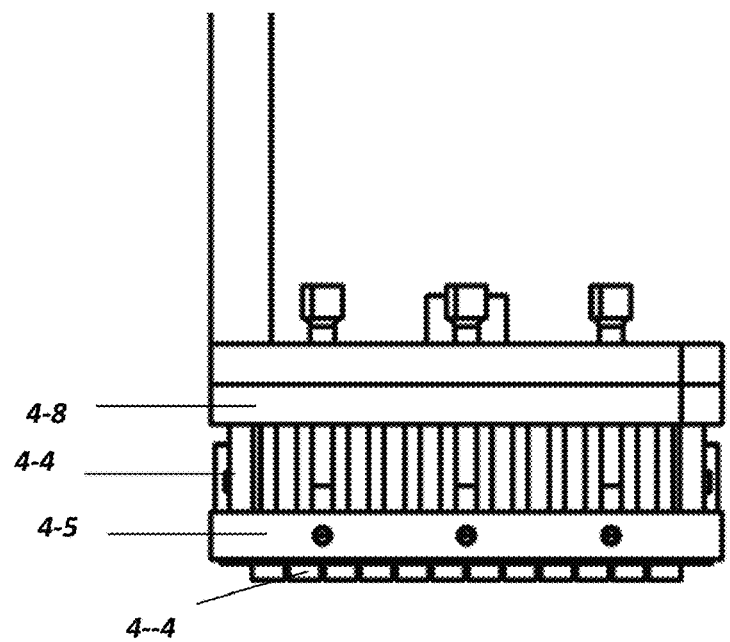
FIG. 10B is a cross-sectional view of a film pressing module in position in the film sealing module.
Figure 11:
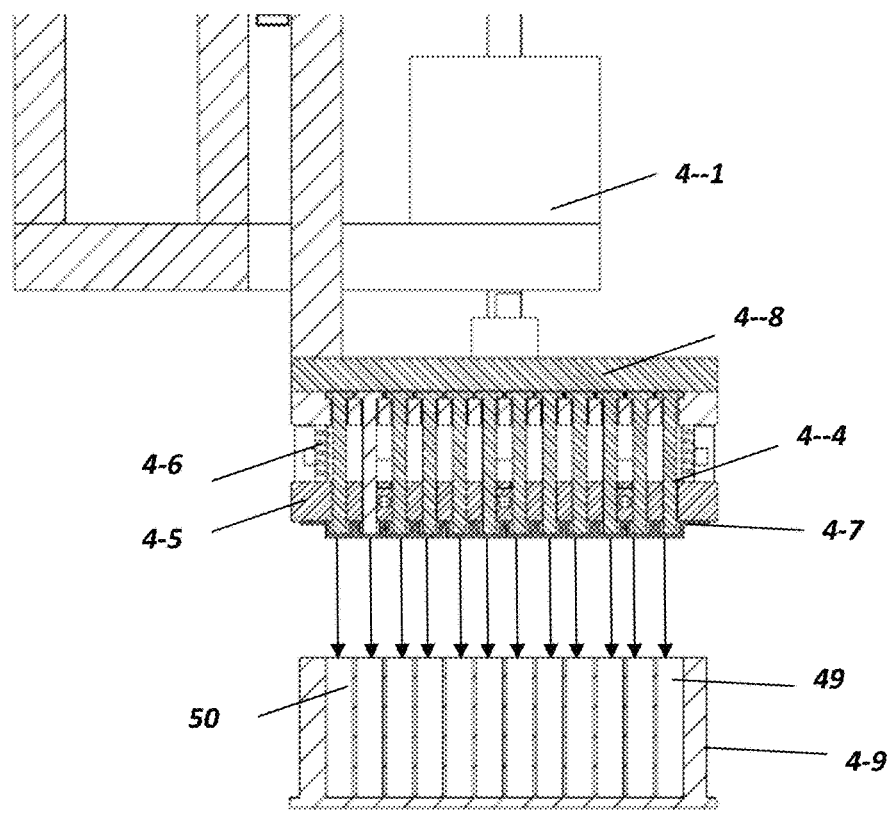
FIG. 11 is a partial schematic diagram of film sealing according to the present disclosure.
Figure 12:
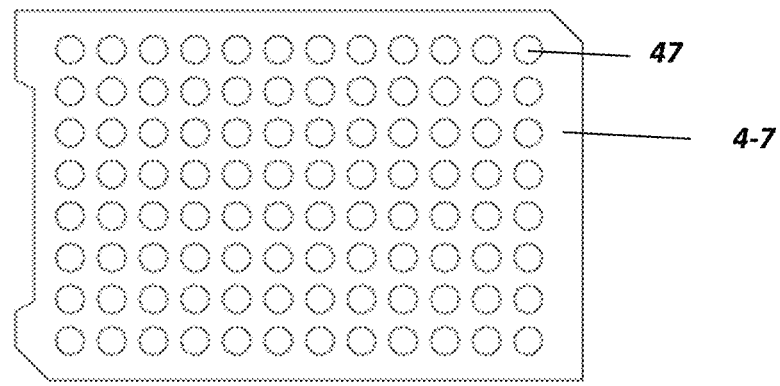
FIG. 12 is a top view of a silicone membrane.
Figure 13:
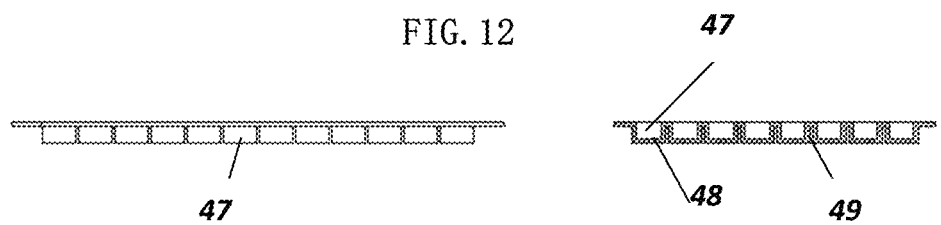
FIG. 13 is a right view (left) and a cross-sectional view (right) of the silicone membrane.
Figure 14:
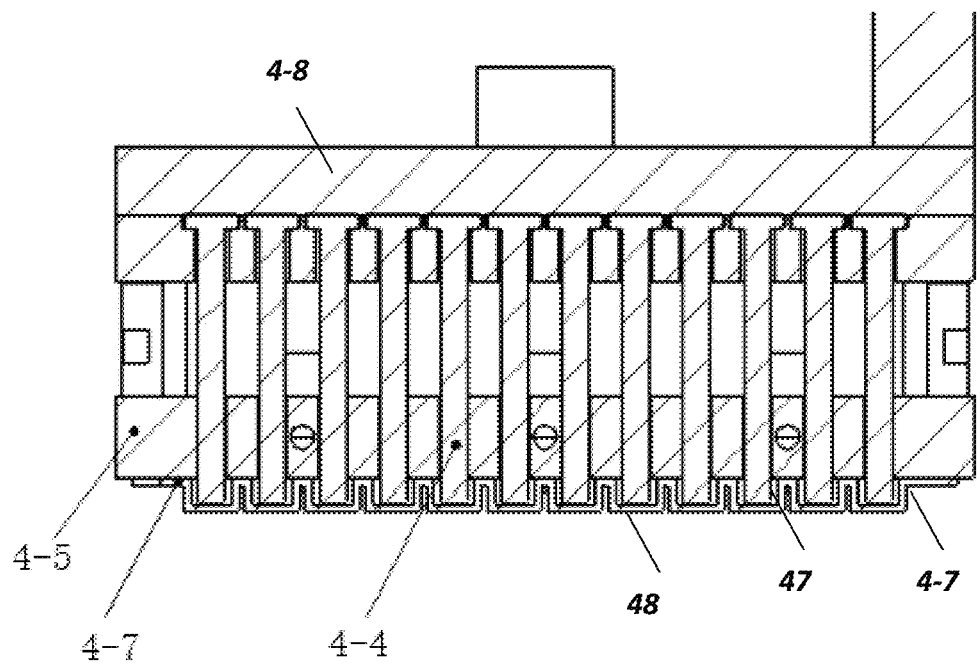
FIG. 14 is a cross-sectional structure view of the film sealing module drawing up the silicone membrane.
Figure 15:
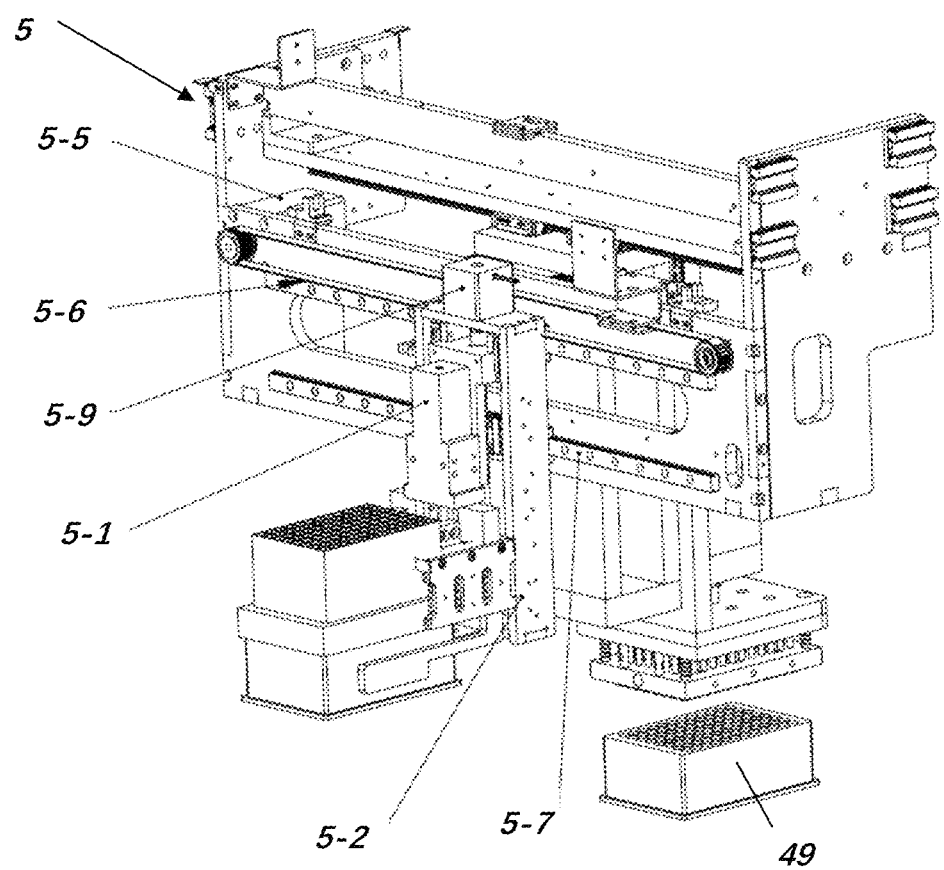
FIG. 15 is a schematic diagram of a handling module according to the present disclosure.
Figure 16:
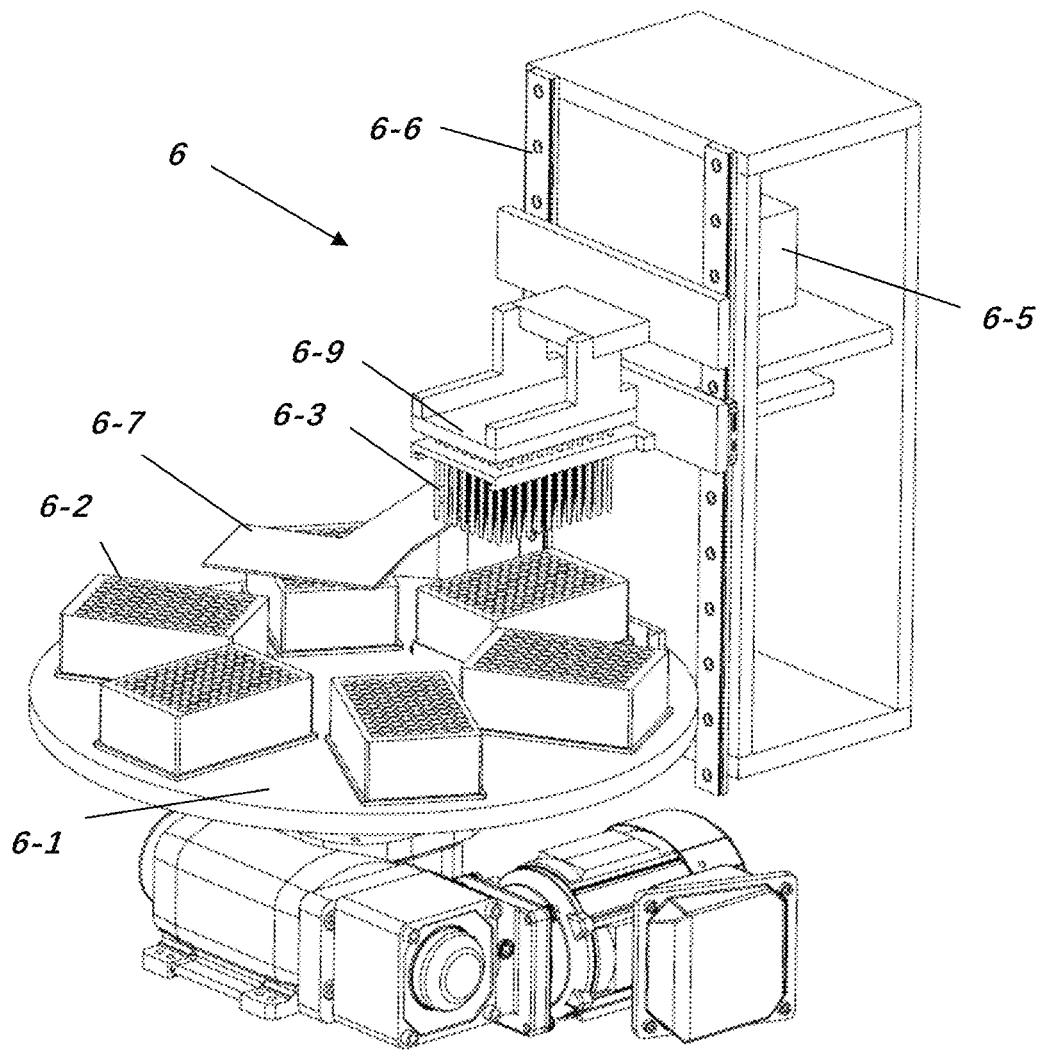
FIG. 16 is an overall schematic diagram of a magnetic solid phase extraction module according to the present disclosure.

Generally, the perforated plate has a reagent plate with 96 holes. When the sample or reagent drops into each hole, it needs to be reacted or treated under certain conditions. Such a perforated plate can treat 96 samples at the same time. Sometimes, it is necessary to centrifuge multi-porous plates, and sometimes it is necessary to heat or dry the porous plates, so it is necessary to seal the holes on the porous plates to prevent samples from leaking during operation, resulting in cross-contamination of samples and reducing the quasi-determination of detection. Therefore, the present disclosure provides an automatic film sealing module of a perforated plate, and self-sealing of 96 deep holes on the perforated plate is achieved by the automatic film sealing module. The film sealing module comprises an adaptor plate 4-5 for vacuum adsorption of the film, the adaptor plate is connected to a vacuum pump or a negative pressure pump, and the plate is provided with a plurality of holes 45 through which gas can be sucked away. At the same time, one end 44 of the molding column 4-4 can pass through the through hole 45 to expose a little bit (FIG. 10B), and the exposed molding column 4-4 is inserted into the recessed hole 47 of the silicone membrane, since there is a mechanical gap between the molding column and the through hole 45 in the adaptor plate 4-5. The film here is silicone membrane 4-7, which is relatively hard, but can still enter the porous holes on the porous plate for sealing, as shown in FIGS. 10 and 12-13, and the silicone membrane 4-7 has a plurality of recessed holes 47. Thus, when the adaptor plate comes into contact with the film, one end 44 of the molding column 4-4 is inserted into the recessed hole 47 in the silicone membrane, but does not fill the entire through hole 45, but leaves a tiny space 47. When the loading sample 4-5 is in contact with the silicone membrane 4-7, each molding column 4-4 is inserted into each concave hole 47. At this time, a vacuum pump is started to vacuumize, and the air in the concave hole 47 is pumped away through a mechanical gap to form a negative pressure, so that the film is tightly caped on the adaptor plate, so that the adaptor plate can adsorb the film and move. The adaptor plate moves to above the perforated plate 4-9, to align each molding column 4-4 with the deep hole 49 in the perforated plate 4-9, and to drive the whole film sealing module downward by a motor, so that the silicone membrane covers the surface of the perforated plate 4-9. The end of the molding column 4-4 is allowed to continue downward movement, forcing the hole bottom 48 of the recessed hole 47 in the silicone membrane into the deep hole 49 of the perforated plate, thereby sealing. There is a gap 49 between each of the recessed holes 47 in the porous film 4-7, which is the space 50 between the deep holes in the porous plate, so that all 96 recessed holes 45 in the whole silicone membrane enter into each of the deep holes 49 in the deep-well multiwell plate 4-9, thereby automatically sealing the deep-well multiwell plate.

In some embodiments, the sealing membrane module also includes a sealing membrane pressure spring 4-6, which increases the force of the lower pressure sealing membrane compression column 4-4, so that the concave hole 47 of the silicone membrane can enter the deep hole 49 of the perforated plate, thereby sealing. As can be seen from FIGS. 13 and 11, the depth of the recess 47 of the silica gel is approximately 2-3 mm or 4-5 mm, and the depth of the recess into the deep hole of the perforated plate is the same as the depth of the recess of the silicone membrane. According to the above-mentioned steps, the film sealing compression columns are arranged on the upper surface of the film-handling plate, and these compression columns are fixed on the plates 4-8, and each column can apply pressure to the films 4-7 through the through holes on the film-handling plate, so that the films are pressed like grooves between holes on the perforated plate, thus achieving the sealing of the holes.

In some embodiments, the film sealing module 4 comprises a film sealing stepping motor 4-1, a film sealing transverse guide rail 4-2, a film sealing longitudinal guide rail 4-3, a film sealing compression column 4-4, a film sealing vacuum airway plate 4-5 and a film sealing pressure spring 4-6. The film sealing module 4 is arranged on the side of the handling bracket 5-7 of the handling module 5 away from the handling gripper 5-1, and the film sealing transverse guide rail 4-2 is fixedly arranged on the handling bracket 5-7, and controls other components of the film sealing module 4 to move in the arrangement direction of the film sealing transverse guide rail 4-2. The film sealing longitudinal guide rail 4-3 is connected and fixed with the film sealing transverse guide rail 4-2, and the film sealing stepping motor 4-1 is fixed on the film sealing longitudinal guide rail 4-3 and controls the movement of the film sealing compression column 4-4, the film sealing vacuum airway plate 4-5 and the film sealing pressure spring 4-6. The film sealing compression column 4-4 is provided with a film sealing vacuum airway plate 4-5 near one end of the deep-well multiwell plate requiring seal, and the film sealing compression column 4-4 penetrates through the film sealing vacuum airway plate 4-5. The film sealing compression column 4-4 can pass through the film sealing vacuum airway plate 4-5 under the control of the film sealing stepping motor 4-1.

That is, the film sealing stepping motor 4-1, the film sealing compression column 4-4, the film sealing vacuum airway plate 4-5 and the film sealing pressure spring 4-6 are simultaneously moved transversely and longitudinally by the film sealing transverse guide rail 4-2, the film sealing longitudinal guide rail 4-3 and their corresponding motors (not shown in the figure). The film sealing stepping motor 4-1 controls the film sealing compression column 4-4, the film sealing vacuum airway plate 4-5 and the film sealing pressure spring 4-6 to further move in the longitudinal direction, so as to achieve the film sealing treatment of the deep-well multiwell plate requiring film sealing.

Specifically, the another end of the film sealing pressing column 4-4 is fixed on the handling bracket 5-7 and connected to one end of the film sealing stepping motor 4-1, so that the film sealing stepping motor 4-1 controls the movement of the film sealing pressing column 4-4, that is, the silicone membrane is sealed on the deep-well multiwell plate mainly by pushing the film sealing pressing column 4-4 to move up and down longitudinally. Preferably, the film sealing pressure spring 4-6 is arranged between the film sealing vacuum airway plate 4-5 and the handling bracket 5-7, and the pressure force of the film sealing compression column 4-4 is increased by the film sealing pressure spring 4-6.

That is, the back and forth movement in the horizontal axis and the longitudinal axis direction is achieved through the film sealing transverse guide rail 4-2 and the film sealing longitudinal guide rail 4-3; at this time, a film sealing vacuum airway plate 4-5 will move above the required silicone membrane 4-7, and then move down to the upper surface of the silicone membrane 4-7 and cling to the upper surface thereof, continue to move down for a certain distance to keep the sealing film spring in a compressed state, at this time, the upper surface of the silicone membrane 4-7 is closely attached to the film sealing vacuum airway plate 4-5, vacuum is formed under the action of suction of film sealing vacuum airway plate 4-5, the silicone membrane 4-7 is sucked up, and then move directly above the 96 deep-well multiwell plate, moving down to the silicone membrane 4-7 to come into contact with the 96 deep-well multiwell plate under the action of the sealing film stepping motor 4-1, continuously moving down the sealing film vacuum airway plate 4-5 to press the silicone membrane 4-7 tightly under the action of the sealing film spring force, and at the same time, in the process of moving down the film sealing compression column 4-4 again, the silicone membrane 4-7 is lengthened by boss at the position corresponding to the film sealing compression column 4-4 so that its diameter is reduced, so as to be press into the 96 deep-well multiwell plate easily. That is, preferably, the silicone membrane 4-7 for film sealing is provided with a boss at a position corresponding to the deep-well multiwell plate, and a diameter of the boss is larger than the diameter of the hole of the deep-well multiwell plate. The handling module 5 comprises a handling bracket 5-7, a handling gripper 5-1, a handling clamping block, a handling clamping guide rail 5-3, a handling screw motor 5-4, a handling stepping motor 5-5 and a handling synchronous belt 5-6. The handling stepping motor 5-5 and the handling synchronizing belt 5-6 are provided on the handling bracket 5-7 and control the movement of other components of the handling module 5 in the direction in which the handling synchronizing belt 5-6 is provided. The handling clamping guide rail 5-3 is connected and fixed with the handling synchronous belt 5-6, the handling screw motor 5-4 is fixed on the handling clamping guide rail 5-3, and the screw rod of the handling screw motor 5-4 is connected to the handling gripper 5-1, and the handling gripper 5-1 controls the movement of the handling clamping block. The whole handling clamping block is L-shaped, so as to better carry the deep-well multiwell plate under the molding pressure column.

Magnetic Solid Phase Extraction Module

The present disclosure further includes a magnetic solid phase extraction module 6, which comprises a circular turntable 6-1, six uniformly distributed processing stations 6-2, a magnetic rack 6-9, a sheath 6-3, a screw motor 6-4 matched with the magnetic rack 6-9 and the sheath 6-3, a magnetic solid phase extraction guide rail 6-5 and a magnetic solid phase extraction scaffold 6-6. The screw motor 6-4 matched with the magnetic rack 6-9 and the sheath 6-3 is arranged in the magnetic solid phase extraction scaffold 6-6, the magnetic solid phase extraction guide rail 6-5 is arranged in the longitudinal direction of the magnetic solid phase extraction scaffold 6-6, and the magnetic rack 6-9 and the sheath 6-3 are arranged on the magnetic solid phase extraction guide rail 6-5 and move in the longitudinal direction. The magnetic rack 6-9 is matched with the sheath 6-3, and the sheath 6-3 can cover all the magnetic rods on the magnetic rack 6-9. That is, the up-and-down movement of the magnetic rack 6-9 and the sheath 6-3 on the magnetic solid phase extraction guide rail 6-5 is controlled by the screw motor 6-4 mated with the magnetic rack 6-9 and the sheath 6-3. The six processing stations 6-2 uniformly distributed on the circular turntable 6-1 can be controlled and rotated by corresponding motors. After the corresponding reagent solution is loaded into the corresponding processing stations 6-2 by other devices, the magnetic rod and the sheath 6-3 are operated to implement the magnetic solid phase extraction operation. The uniformly distributed six processing stations 6-2 are an activation processing station 6-2, a balance processing station 6-2, a sample loading processing station 6-2, a first elution processing station 6-2, a second elution processing station 6-2 and an elution processing station 6-2, and the reagent solution is added according to this sequence every time, and the magnetic solid phase extraction operation is also processed according to this station sequence.

Specifically, the circular turntable 6-1 is controlled by an indexing disk, which is arranged below the circular turntable 6-1 and connected to the circular turntable 6-1. The rotation angle of the circular turntable 6-1 can be accurately controlled by the arrangement of the indexing disk, thereby reducing the control by other high-precision instruments and increasing the cost.

The magnetic solid phase extraction module also comprises a cover plate 6-7, one end of the cover plate 6-7 is connected to the motor of the cover plate 6-7, and is controlled by the motor of the cover plate 6-7 for rotation shielding. In addition, the cover plate 6-7 can cove the whole magnetic rack 6-9 to prevent the solution from falling off the outside of the sheath 6-3. The whole structure is at an obtuse angle, by a standard that it can cover the whole magnetic rack 6-9.

The magnetic solid phase extraction module also comprises a heating module 6-8, which is arranged below the circular turntable 6-1, and the heating module 6-8 is arranged at the corresponding position of the circular turntable 6-1 closest to the magnetic solid phase extraction scaffold 6-6. The heating module is 6-8 can also be connected to the magnetic solid phase extraction guide rail 6-5, the heating module 6-8 is connected to an oscillating motor, and is controlled by the oscillating motor as a whole. That is, the oscillating motor can also be directly arranged in the magnetic solid phase extraction scaffold 6-6.

During the magnetic solid phase extraction, the reagent solution in the 96 deep-well multiwell plate is added to the first station (the activation processing station 6-2) of the six processing stations 6-2 through a corresponding pipette, and the deep-well multiwell plate is rotated at a certain angle every time after adding until all the 96 deep-well multiwell plates in the six processing stations 6-2 are added. Then the first station (the activation processing station 6-2) is transferred to the lower portion of the magnetic rack 6-9 by the circular turntable 6-1, and the sheath 6-3 moves up and down under the action of the screw motor 6-4, so that the reagent solution is fully mixed. After the activation of the first station is completed, the sheath 6-3 moves down to the bottom of the 96 deep-well multiwell plate, and the magnetic rack 6-9 is controlled to move down to the bottom of the 96 deep-well multiwell plate at the same time. At this time, the magnetic bead solution is adsorbed on the periphery of the sheath 6-3, and then the sheath 6-3 and the magnetic rack 6-9 start to move up under the action of the screw motor 6-4. When the 96 deep-well multiwell plate is moved out, the cover plate 6-7 rotates under the magnetic rack 6-9 to protect the solution outside the sheath 6-3 from falling and polluting other solutions.

The circular turntable 6-1 rotates again to the 96 deep-well multiwell plate of the next processing station 6-2, the cover plate 6-7 rotates back to the origin, the sheath 6-3 and the magnetic rack 6-9 move down to the bottom of the 96 deep-well multiwell plate of the processing station 6-2 at the same time, the sheath 6-3 does not move, the magnetic rack 6-9 moves up to the highest point, and the next operation is not followed.

Then the sheath 6-3 moves up and down to fully mix the reagent solution, and so on until the mixing in the last 96 deep-well multiwell plate of the six processing stations 6-2 is completed.

Due a heating module 6-8 under the corresponding circular turntable 6-1, the heating module 6-8 can move up and down for heating when the station to be heated moves to the position. That is to say, when heating is needed, the heating module is moved up to the bottom of the 96 deep-well multiwell plate, and moved down after heating is completed, which will not affect the rotation of the circular turntable 6-1. Naturally, it is easier to provide a corresponding up-and-down movement structure (not shown) at a position corresponding to the magnetic rack 6-9.

SPE (Solid Phase Extraction) Positive Pressure Extraction

Based on theory of liquid-solid chromatography, solid phase extraction technology enriches, separates and purifies samples by selective adsorption and elution, which is a physical extraction process including liquid phase and solid phase; it can also be regarded as a simple chromatographic process. The solid phase extraction is the separation principle of liquid chromatography using selective adsorption and selective elution. The commonly used method is to make the liquid sample pass through an adsorbent, retain the measured substance, then choose a solvent with appropriate strength to wash away impurities, and then elute the measured substance with a small amount of good solvent, so as to achieve the purpose of rapid separation, purification and concentration. It can also selectively adsorb interfering impurities and let the tested substances flow out; or adsorb impurities and tested substances at the same time, and then selectively elute the tested substances with appropriate solvents.

Figure 17:
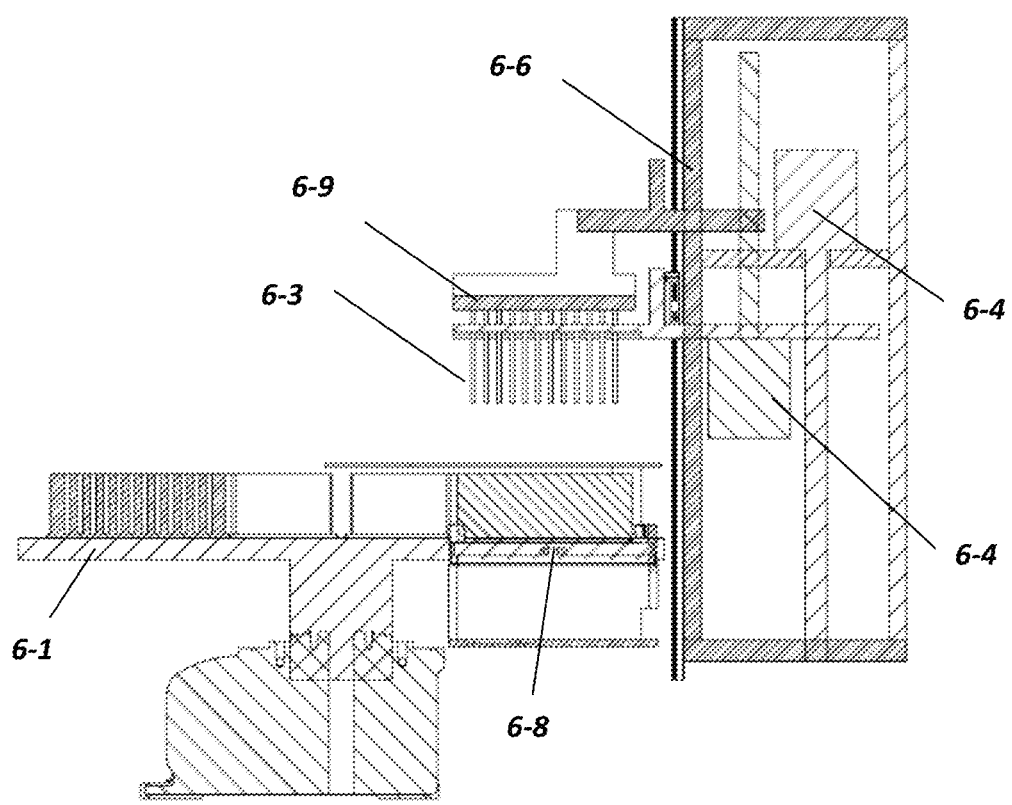
FIG. 17 is a cross-sectional view of the magnetic solid phase extraction module according to the present disclosure.
Figure 18:
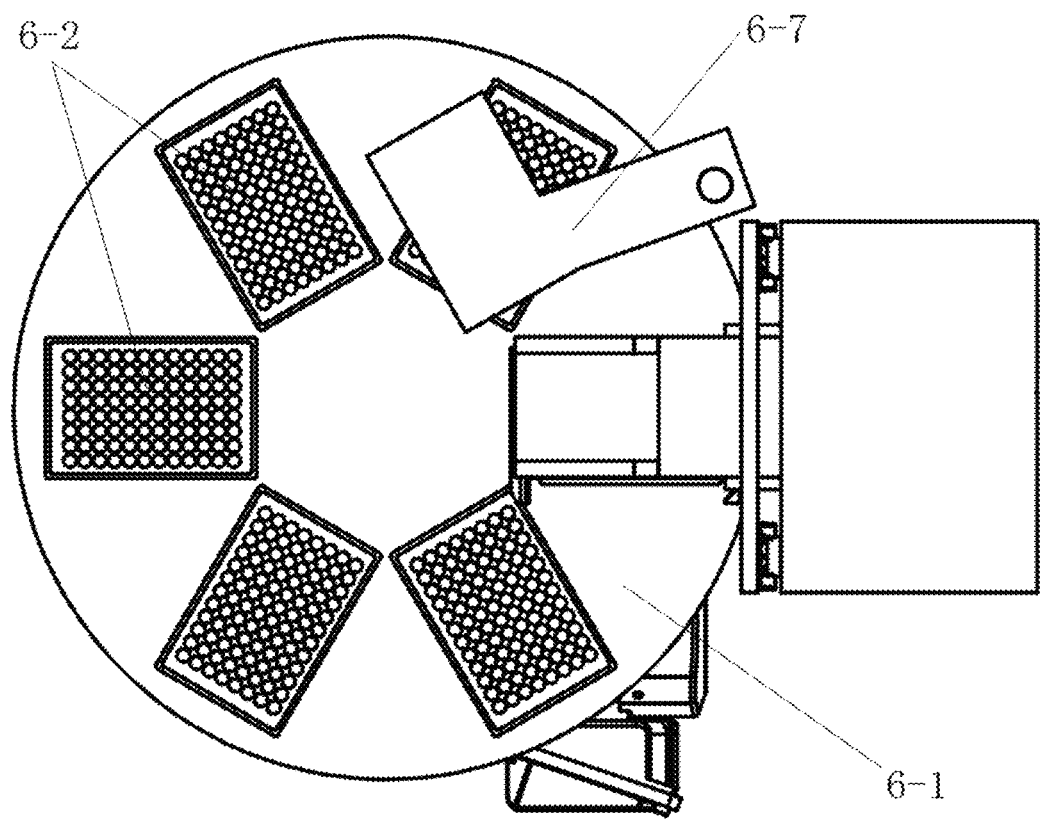
FIG. 18 is a top view of the magnetic solid phase extraction module according to the present disclosure.
Figure 19:
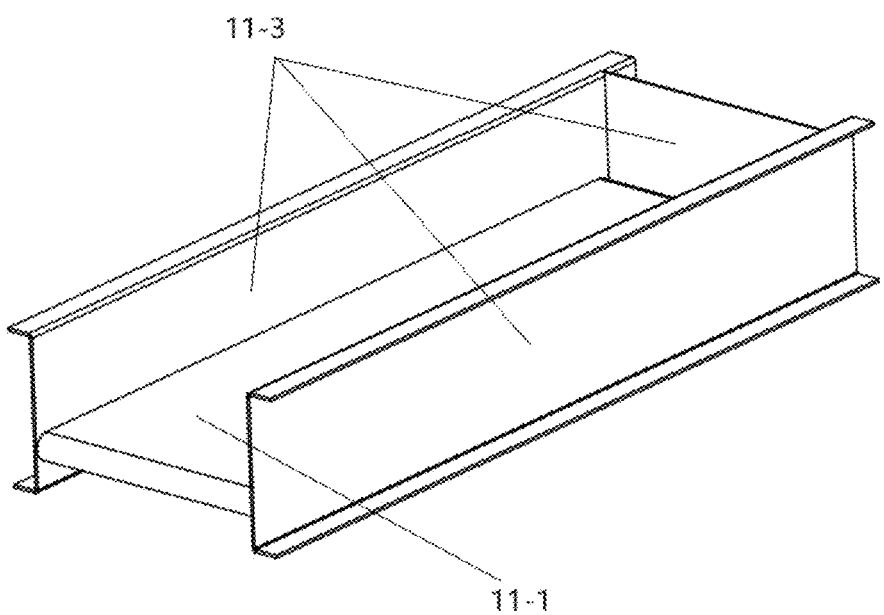
FIG. 19 is a schematic diagram of a conveyor belt waste transfer module according to the present disclosure.
Figure 20:
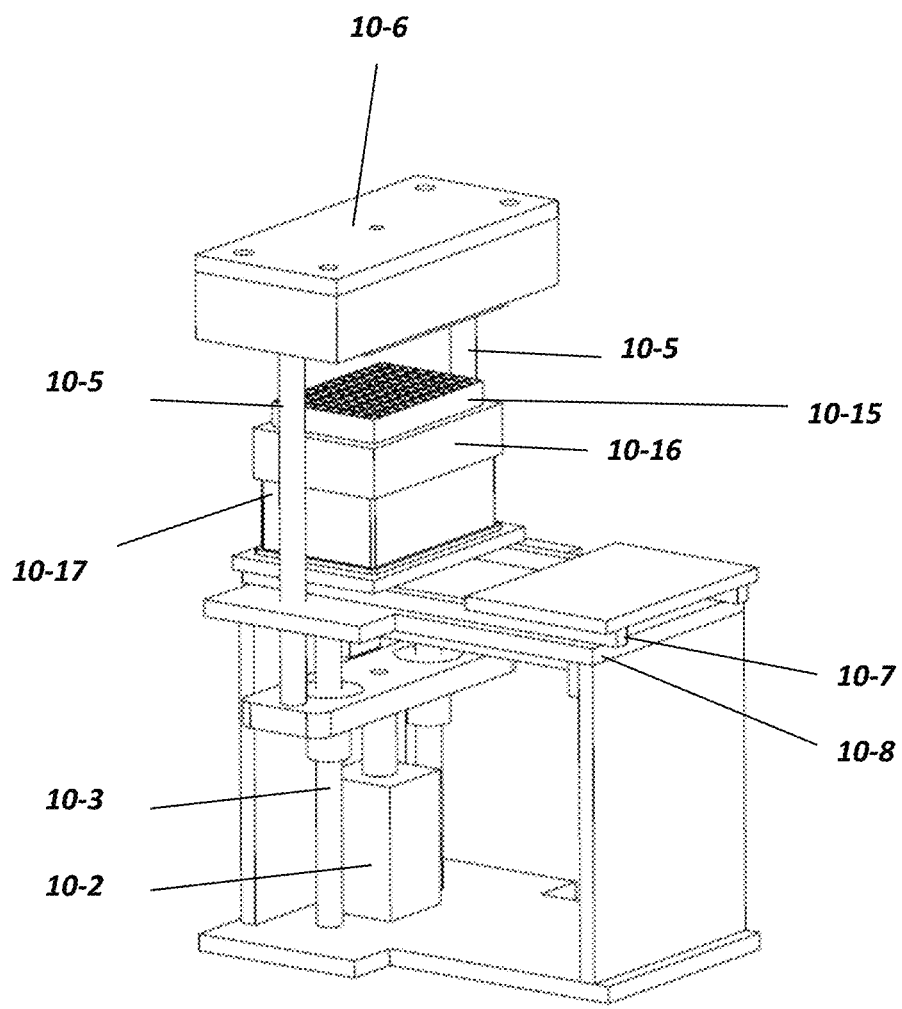
FIG. 20 is a schematic diagram of an SPE positive pressure extraction module according to the present disclosure.
Figure 21:
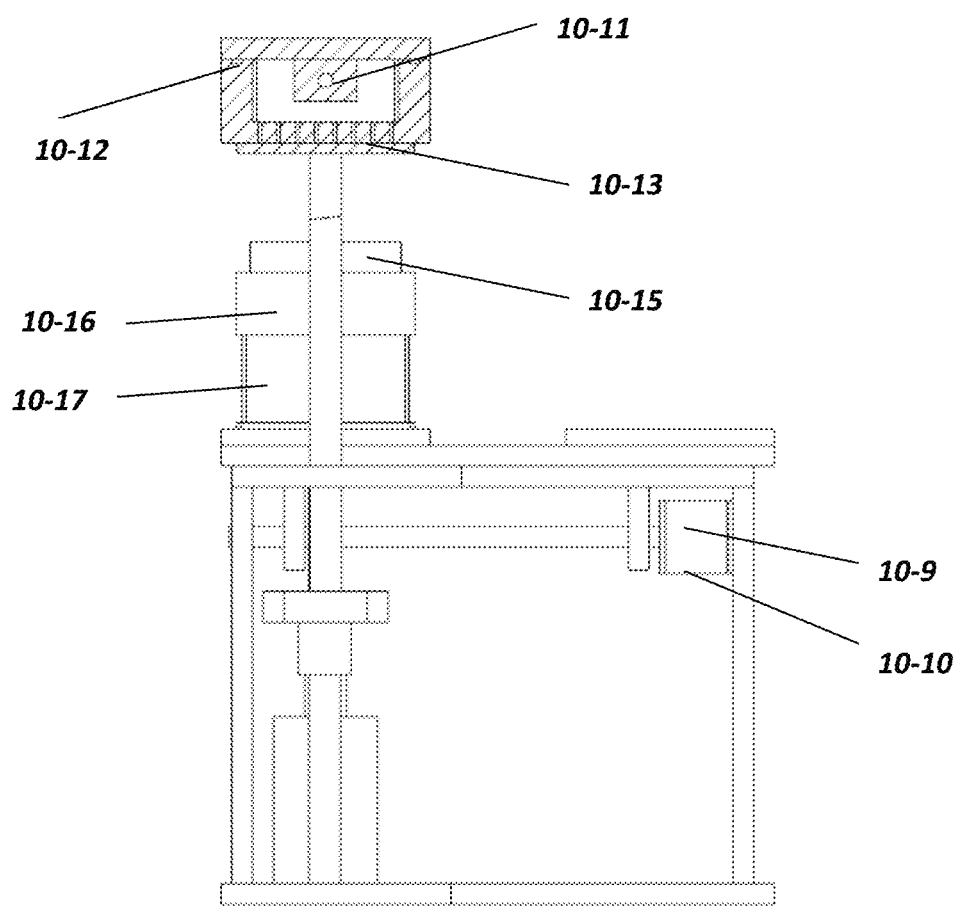
FIG. 21 is a cross-sectional view of the SPE positive pressure extraction module according to the present disclosure.

For example, as shown in FIG. 17, when the liquid passes through the solid phase carrier to separate the analyte in the liquid, it is necessary to let the liquid pass through the solid phase material under a large pressure. As shown in FIG. 17, a solid phase carrier 10-14 is disposed between the two perforated plates, porous plates 10-12 located on a solid phase carrier contain a liquid sample or some pretreated sample in the pores, whereas the porous plate located under the solid phase carrier does not contain any liquid sample, and it is desirable that the sample located in the porous plates 10-12 pass through the solid phase carrier and flow into the underlying porous plate. After passing the liquid sample, the solid phase carrier needs to be washed several times, and then the target substance of the solid phase carrier is eluted. It is not easy for the liquid to pass through the solid phase carrier. Generally, it is necessary to apply pressure to the liquid sample, liquid to be washed and eluent in order to carry out effective treatment. In the case of pressure application, it is necessary to carry out the treatment by exerting the environment protection, for example, to carry out the treatment by exposing the whole solid phase carrier to nitrogen.

The present disclosure adopts automatic equipment for automatic processing. When the SPE positive pressure extraction module is in operation, in specific, the SPE positive pressure extraction module 10 comprises a positive pressure extraction scaffold, a positive pressure extraction longitudinal control cylinder 10-2, a positive pressure extraction longitudinal guide rail 10-3, a positive pressure extraction support rod 10-4, a positive pressure extraction pressing block 10-5, a positive pressure extraction sealing cap 10-6, a positive pressure extraction transverse guide rail 10-7, a positive pressure extraction bottom plate 10-8, a positive pressure extraction screw motor 10-9 and a positive pressure extraction support plate 10-10.

The positive pressure extraction pressing block 10-5 is arranged above the positive pressure extraction scaffold, and the positive pressure extraction pressing block 10-5 is connected to the positive pressure extraction scaffold through the positive pressure extraction support rod 10-4. The positive pressure extraction longitudinal control cylinder 10-2 is arranged in the positive pressure extraction scaffold, and the positive pressure extraction longitudinal control cylinder 10-2 controls the positive pressure extraction pressing block 10-5 to move in the longitudinal direction.

The positive pressure extraction module further comprises a positive pressure extraction guide plate, two ends of the positive pressure extraction support rod 10-4 are respectively connected to the fixed positive pressure extraction guide plate and the positive pressure extraction pressing block 10-5, the positive pressure extraction guide plate is also provided with a through hole for the positive pressure extraction guide rail to pass through, and the positive pressure extraction guide plate is connected to the positive pressure extraction longitudinal control cylinder 10-2.

The positive pressure extraction transverse guide rail 10-7 is arranged on an upper surface of the positive pressure extraction scaffold, which is connected to and controlled by the positive pressure extraction screw motor 10-9; the positive pressure extraction screw motor 10-9 is arranged on the positive pressure extraction scaffold plate 10-10, and the positive pressure extraction scaffold plate 10-10 is arranged at a position close to the upper surface inside the positive pressure extraction scaffold; the positive pressure extraction bottom plate 10-8 is arranged on the positive pressure extraction transverse guide rail 10-7, and an orifice plate and an SPE plate are placed on the positive pressure extraction bottom plate 10-8.

The positive pressure extraction muffler 10-11 is arranged inside the positive pressure extraction pressing block 10-5, a positive pressure extraction sealing ring 10-12 is arranged at a contact position of the sealing cap of the positive pressure extraction pressing block 10-5 and the positive pressure extraction pressing block 10-5, a positive pressure extraction silicone pad 10-13 is arranged at the bottom of the positive pressure extraction pressing block 10-5, and an air inlet hole is arranged at the central position of the sealing cap of the positive pressure extraction pressing block 10-5 for nitrogen to enter.

Automatic Sample Pretreatment Method

The present disclosure discloses a fully automatic sample pretreatment method, the specific operation of which comprises the following steps:

101) pretreatment step: placing a corresponding sample and a corresponding reagent solution on a platform module 8; and arranging a magnetic solid phase extraction module 6 or replacing it with an SPE positive pressure extraction module 10 as required;

102) cap removing step: clamping the sample blood-collection tube through the blood-collection tube grasping module 2 and transferring the sample blood-collection tube to the cap removing module 1 by a pipette module 3; fixing the sample blood-collection tube by the cap removing module 1 and removing an upper lid of the blood-collection tube in coordination with the upward movement of the blood-collection tube grasping module 2;

specifically, the blood-collection tube is moved from the blood-collection tube grasping module 2 to the cap removing module 1, the cap removing module 1 clamps and fixes the lower portion of the blood-collection tube, while the blood-collection tube grasping module 2 does not need to clamp the blood-collection tube at this time. The blood-collection tube gripper controls the blood-collection tube clamping block to relax, but the blood-collection tube still stands on the blood-collection tube clamping block, and the blood-collection tube screw motor controls it to move up, thus removing the upper cover of the blood-collection tube and completing the cap removing;

103) sampling step: Taking out the sample needed to be sampled in the blood collection pipe fixed by the cap removing module 1 through the pipette module 3, and moving the sample into the corresponding deep-well multiwell plate by the pipette module 3;

104) film sealing step: handling the deep-well multiwell plate of step 103) to a corresponding position by the handling module 5, and performing film sealing by the film sealing module 4;

Specifically, the back and forth movement in the horizontal axis and the longitudinal axis direction is achieved through the film sealing transverse guide rail and the film sealing longitudinal guide rail; at this time, a film sealing vacuum airway plate will move above the required silicone membrane, and then move down to the upper surface of the silicone membrane and cling to the upper surface thereof, continue to move down for a certain distance to keep the sealing film spring in a compressed state, at this time, the upper surface of the silicone membrane is closely attached to the film sealing vacuum airway plate, vacuum is formed under the action of suction of film sealing vacuum airway plate, the silicone membrane is sucked up, and then move directly above the deep-well multiwell plate, moving down to the silicone membrane to come into contact with the deep-well multiwell plate under the action of the sealing film stepping motor, continuously moving down the sealing film vacuum airway plate to press the silicone membrane tightly under the action of the sealing film spring force, and at the same time, in the process of moving down the film sealing compression column again, the silicone membrane is lengthened by boss at the position corresponding to the film sealing compression column so that its diameter is reduced, so as to be press into the deep-well multiwell plate;

105) sample processing step: installing the module magnetic solid phase extraction module 6 or SPE positive pressure extraction module 10 required for performing corresponding processing, and conducting corresponding processing;

when the magnetic solid phase extraction module 6 is selected, the reagent solution in the deep-well multi-well plate is added to the first station of the six processing stations through the corresponding pipette, and the module is rotated at a certain angle every time until all the deep-well multiwell plates in the six processing stations are added. Then, the first station is transferred to the lower portion of the magnetic rack by the circular turntable, and the sheath moves up and down under the action of the screw motor, so that the reagent solution is fully mixed. After the activation of the first station is completed, the sheath moves down to the bottom of the deep-well multiwell plate, and the magnetic rack is controlled to move down to the bottom of the deep-well multiwell plate at the same time. At this time, the magnetic bead solution is adsorbed on the periphery of the sheath, and then the sheath and the magnetic rack start to move up under the action of the screw motor. When the deep-well multiwell plate is moved out, the cover plate rotates under the magnetic rack to protect the solution outside the sheath from falling and polluting other solutions.

The circular turntable rotates again to the deep-well multiwell plate of the next processing station, the cover plate rotates back to the origin, the sheath and the magnetic rack move down to the bottom of the deep-well multiwell plate of the processing station at the same time, the sheath does not move, the magnetic rack moves up to the highest point, and the next operation is not followed.

Then the sheath moves up and down to fully mix the reagent solution, and so on until the mixing in the last deep-well multiwell plate of the six processing stations is completed.

The foregoing are only preferred embodiments of the present disclosure, and it should be noted that several improvements and modifications can also be made by those skilled in the art without departing from the concept of the present disclosure, and these improvements and modifications should also be regarded as the scope protection of the present disclosure.

The invention claimed is:

1. A full-automatic sample pretreatment device, comprising a frame module, a cap removing module, a blood-collection tube grasping module, a pipette module, a handling module, a film sealing module, a magnetic solid phase extraction module, a solid phase extraction (SPE) positive pressure extraction module, and a conveyor belt waste transfer module; the conveyor belt waste transfer module is arranged at a bottom of the frame module, the cap removing module, the platform module and the magnetic solid phase extraction module are sequentially arranged in a middle of the frame module from left to right, and the blood-collection tube grasping module, the pipette module, the handling module and the film sealing module are arranged at an upper portion of the frame module; wherein the magnetic solid phase extraction module and the SPE positive pressure extraction module are detachable and interchangeable components;

wherein the cap removing module comprises a cap removing support block, a cap removing stepping motor, cap removing reverse screw rods, a cap removing synchronous belt, cap removing clamping blocks and a cap removing guide rail, two ends of the cap removing clamping block are provided with the cap removing support blocks and is configured to fix a blood-collection tube and achieve cap removing of the blood-collection tube in combination with a part of the blood-collection tube grasping module;

the blood-collection tube grasping module comprises a blood-collection tube gripper, a blood-collection tube clamping block, a blood-collection tube grasping guide rail, a blood-collection tube screw motor, a blood-collection tube stepping motor and a blood-collection tube synchronous belt and is configured to grasp the blood-collection tube; the pipette module comprises a pipette bracket, a four-channel pipette, a pipette isometric conversion module, a pipette guide rail and a pipette Y-axis guide rail and is configured to make a corresponding sampled liquid shifted; the handling module is configured to make a liquid and a sample be handled; the film sealing module is configured to achieve film sealing of the sampled liquid; the conveyor belt waste transfer module comprises a waste transferring belt, a waste transferring motor, and waste transferring baffles; two sides of the waste transferring belt are provided with waste transferring baffles, and the waste transferring motor is disposed on one waste transferring baffle at one side; and one end of the waste transferring belt is also provided with another waste transferring baffle;

wherein the handling module comprises a handling bracket, a handling gripper, a handling clamping block, a handling clamping guide rail, a handling screw motor, a handling stepping motor and a handling synchronous belt;

the handling stepping motor and the handling synchronous belt are arranged on the handling bracket and control other parts of the handling module to move in an arrangement direction of the handling synchronous belt; the handling clamping guide rail is connected and fixed with the handling synchronous belt, the handling screw motor is fixed on the handling clamping guide rail, and a screw rod of the handling screw motor is connected to the handling gripper, and the handling gripper controls movement of the handling clamping block; and the whole handling clamping block is L-shaped;

wherein the film sealing module comprises a film sealing stepping motor, a film sealing transverse guide rail, a film sealing longitudinal guide rail, a film sealing compression column, a film sealing vacuum airway plate and a film sealing pressure spring; the film sealing module is arranged on a side of the handling bracket of the handling module away from the handling gripper, the film sealing transverse guide rail is fixedly arranged on the handling bracket to control other parts of the film sealing module to move in an arrangement direction of the film sealing transverse guide rail; the film sealing longitudinal guide rail is connected and fixed with the film sealing transverse guide rail, and the film sealing stepping motor is fixed on the film sealing longitudinal guide rail and controls movement of the film sealing compression column, the film sealing vacuum airway plate and the film sealing pressure spring; the film sealing vacuum airway plate is arranged near one end of the film sealing compression column near a deep-well multiwell plate requiring film sealing, and the film sealing compression column penetrates the film sealing vacuum airway plate;

wherein another end of the film sealing compression column is fixed on the handling bracket and connected to one end of the film sealing stepping motor, so that the film sealing stepping motor controls the movement of the film sealing compression column, and the film sealing pressure spring is arranged between the film sealing vacuum airway plate and the handling bracket;

wherein the magnetic solid phase extraction module comprises a circular turntable, six uniformly distributed processing stations, a magnetic rack, a sheath, a screw motor matched with the magnetic rack and the sheath, a magnetic solid phase extraction guide rail and a magnetic solid phase extraction scaffold, the screw motor matched with the magnetic rack and the sheath is arranged in the magnetic solid phase extraction scaffold, the magnetic solid phase extraction guide rail is arranged in a longitudinal direction of the magnetic solid phase extraction scaffold, and the magnetic rack and the sheath are arranged on the magnetic solid phase extraction guide rail and move in the longitudinal direction, the magnetic rack is matched with the sheath, and the sheath is capable of covering all the magnetic rods on the magnetic rack, the circular turntable is controlled by an indexing disk, and the indexing disk is arranged below the circular turntable and connected to the circular turntable;

the SPE positive pressure extraction module comprises a positive pressure extraction scaffold, a positive pressure extraction longitudinal control cylinder, a positive pressure extraction longitudinal guide rail, a positive pressure extraction support rod, a positive pressure extraction pressing block, a positive pressure extraction sealing cap, a positive pressure extraction transverse guide rail, a positive pressure extraction bottom plate, a positive pressure extraction screw motor and a positive pressure extraction support plate;

the positive pressure extraction pressing block is arranged above the positive pressure extraction scaffold, and the positive pressure extraction pressing block is connected to the positive pressure extraction scaffold through the positive pressure extraction support rod, the positive pressure extraction longitudinal control cylinder is arranged in the positive pressure extraction scaffold, and the positive pressure extraction longitudinal control cylinder controls the positive pressure extraction pressing block to move in the longitudinal direction;

the positive pressure extraction module further comprises a positive pressure extraction guide plate, two ends of the positive pressure extraction support rod are respectively connected to the fixed positive pressure extraction guide plate and the positive pressure extraction pressing block, the positive pressure extraction guide plate is also provided with a through hole for the positive pressure extraction guide rail to pass through, and the positive pressure extraction guide plate is connected to the positive pressure extraction longitudinal control cylinder;

the positive pressure extraction transverse guide rail is arranged on an upper surface of the positive pressure extraction scaffold, which is connected to and controlled by the positive pressure extraction screw motor; the positive pressure extraction screw motor is arranged on the positive pressure extraction scaffold plate, and the positive pressure extraction scaffold plate is arranged at a position close to the upper surface inside the positive pressure extraction scaffold; the positive pressure extraction bottom plate is arranged on the positive pressure extraction transverse guide rail, and an orifice plate and an SPE plate are placed on the positive pressure extraction bottom plate;

the positive pressure extraction muffler is arranged inside the positive pressure extraction pressing block, a positive pressure extraction sealing ring is arranged at a contact position of the sealing cap of the positive pressure extraction pressing block and the positive pressure extraction pressing block, a positive pressure extraction silicone pad is arranged at the bottom of the positive pressure extraction pressing block, and an air inlet hole is arranged at the central position of the sealing cap of the positive pressure extraction pressing block for nitrogen to enter.

2. The full-automatic sample pretreatment device according to claim 1, wherein the cap removing module, the blood-collection tube grasping module and the pipette module constitute a sampling device, where the blood-collection tube grasping module is arranged on a left side of the pipette module, and the cap removing module is arranged below the pipette module;

wherein the blood-collection tube stepping motor and the blood-collection tube synchronous belt are fixed on a side of the pipette module close to the blood-collection tube grasping module, to control other parts of the blood-collection tube grasping module to move in an arrangement direction of the blood-collection tube synchronous belt, the blood-collection tube grasping guide rail is connected and fixed with the blood-collection tube synchronous belt, the blood-collection tube screw motor is fixed on the blood-collection tube grasping guide rail, and a screw rod of the blood-collection tube screw motor is connected to the blood-collection tube gripper, and the blood-collection tube gripper controls a movement of the blood-collection tube clamping block;

wherein the cap removing clamping block is connected to the cap removing guide rail through the cap removing reverse screw rod, and the cap removing reverse screw rods at both ends of the cap removing clamping block are connected through the cap removing synchronous belt, the cap removing reverse screw rod is connected to and controlled by the stepping motor, the cap removing clamping blocks adopt two identical convex blocks, and the blood-collection tube is clamped between longest sides of the two convex blocks;

wherein the pipette isometric conversion module is arranged on a side of the pipette bracket away from the blood-collection tube grasping module, the pipette guide rail is arranged on a side of the pipette isometric conversion module away from the blood-collection tube grasping module, the four-channel pipette is arranged on the pipette guide rail, and the pipette Y-axis guide rail is arranged on the pipette bracket to drive the pipette isometric conversion module of the pipette module to move.

3. The full-automatic sample pretreatment device according to claim 2, wherein the blood-collection tube clamping blocks are cross-sectional L-shaped clamp blocks symmetrically arranged, and the cross-sectional L-shaped clamp blocks are controlled by the blood-collection tube gripper to move in opposite directions to form a clamping force, and blood-collection tube clamping balls are distributed on the blood-collection tube clamping blocks.

4. The full-automatic sample pretreatment device according to claim 2, wherein a cap removing pressure spring and a cap removing pressing block are arranged in the convex blocks of the cap removing clamping blocks, the cap removing pressure spring is fixed in one side away from the longest side of the convex block, and the cap removing pressure spring is connected to the cap removing pressing block.

5. The full-automatic sample pretreatment device according to claim 2, wherein a cap removing ball screw is arranged in the convex blocks of the cap removing clamping blocks, one end of the cap removing ball screw is fixed in one side away from the longest side of the convex block, and a head of the cap removing ball screw is exposed outside the convex blocks.

6. The full-automatic sample pretreatment device according to claim 2, wherein the pipette isometric conversion module comprises a pipette isometric conversion bracket, pipette fixing blocks, two pipette isometric conversion screw rods, and a pipette isometric conversion motor, wherein the two pipette isometric conversion screw rods are arranged on the pipette isometric conversion bracket, the two pipette isometric conversion screw rods run through four pipette fixing blocks, two pipette fixing blocks in the middle are controlled by one of the two pipette isometric conversion screw rods, two pipette fixing blocks on outer sides are controlled by another one of the two pipette isometric conversion screw rods, the two pipette isometric conversion screw rods are connected to the pipette isometric conversion motor through a conveyor belt, and the pipette fixing blocks are connected to a pipette guide rail;

four modules in the four-channel pipette can move up and down independently, and tip integrated pipetting (TIP) heads of each module are moved on the pipette guide rail by the pipette fixing blocks of the pipette isometric changing module.

7. The full-automatic sample pretreatment device according to claim 1, further comprising a cover plate, wherein one end of the cover plate is connected to a cover plate motor and controlled by the cover plate motor to rotate and block, and the cover plate covers the whole magnetic rack.

8. The full-automatic sample pretreatment device according to claim 1, further comprising a heating module, wherein the heating module is arranged below the circular turntable, and the heating module is arranged at a corresponding position of the stations closest to the magnetic solid phase extraction scaffold of the circular turntable;

wherein the heating module is connected to the magnetic solid phase extraction guide rail, the heating module is connected to an oscillating motor and is controlled by the oscillating motor as a whole.

\* \* \* \* \*